US010823747B2

(12) United States Patent
Oshio

(10) Patent No.: US 10,823,747 B2
(45) Date of Patent: Nov. 3, 2020

(54) INERTIAL SENSOR ELEMENT CONTROL DEVICE, INERTIAL SENSOR, ELECTRONIC APPARATUS, VEHICLE AND METHOD OF UPDATING TEMPERATURE COMPENSATION INFORMATION OF INERTIAL SENSOR ELEMENT CONTROL DEVICE

(71) Applicant: Seiko Epson Corporation, Tokyo (JP)

(72) Inventor: Masahiro Oshio, Shiojiri (JP)

(73) Assignee: Seiko Epson Corporation (JP)

( * ) Notice: Subject to any disclaimer, the term of this patent is extended or adjusted under 35 U.S.C. 154(b) by 259 days.

(21) Appl. No.: 15/964,506

(22) Filed: Apr. 27, 2018

(65) Prior Publication Data

US 2018/0313864 A1 Nov. 1, 2018

(30) Foreign Application Priority Data

Apr. 28, 2017 (JP) ................................ 2017-089802

(51) Int. Cl.
*G01P 1/00* (2006.01)
*G01C 19/56* (2012.01)
*G01P 21/00* (2006.01)

(52) U.S. Cl.
CPC .............. *G01P 1/006* (2013.01); *G01C 19/56* (2013.01); *G01P 21/00* (2013.01)

(58) Field of Classification Search
CPC .......... G01P 1/006; G01P 21/00; G01C 19/56
USPC ... 73/497, 1.37, 1.38, 1.39, 1.75–1.77, 1.79, 73/504.02–504.16, 504.18, 514.01–514.38
See application file for complete search history.

(56) References Cited

U.S. PATENT DOCUMENTS

2005/0071118 A1 3/2005 Usuda et al.
2007/0005215 A1* 1/2007 Nishioka ................ G01P 21/00 701/74

FOREIGN PATENT DOCUMENTS

| | | | |
|---|---|---|---|
| JP | 2005-331332 | A | 12/2005 |
| JP | 2008-003002 | A | 1/2008 |
| JP | 2008-135075 | A | 6/2008 |
| JP | 2012-037405 | A | 2/2012 |
| JP | 2013-527915 | A | 7/2013 |
| JP | 2015-052510 | A | 3/2015 |
| JP | 2015-179887 | A | 10/2015 |
| WO | WO-2011-123149 | A1 | 10/2011 |

* cited by examiner

*Primary Examiner* — Robert R Raevis
(74) *Attorney, Agent, or Firm* — Harness, Dickey & Pierce, P.L.C.

(57) ABSTRACT

A control device connected to an inertial sensor having temperature characteristics, the control device including a memory for storing temperature compensation information, and update history information, an update determination circuit for determining the necessity of a temperature compensation information update based on a signal that is based on an output signal of a temperature sensor and the update history information, a rest determination circuit for determining whether the inertial sensor is at rest, and an updating circuit for updating the temperature compensation information based on the determination of the update determination circuit, the determination of the rest determination circuit, a signal based on an output signal of the inertial sensor, and the signal based on the output signal of the temperature sensor.

20 Claims, 10 Drawing Sheets

INERTIAL SENSOR ELEMENT CONTROL DEVICE, INERTIAL SENSOR, ELECTRONIC APPARATUS, VEHICLE AND METHOD OF UPDATING TEMPERATURE COMPENSATION INFORMATION OF INERTIAL SENSOR ELEMENT CONTROL DEVICE

BACKGROUND

1. Technical Field

The present invention relates to an inertial sensor element control device, an inertial sensor, an electronic apparatus, a vehicle and a method of updating temperature compensation information of the inertial sensor element control device.

2. Related Art

At present, in a variety of systems and electronic apparatuses, there are widely used a variety of inertial sensors capable of detecting a variety types of inertial force such an acceleration sensor for detecting acceleration, and a gyro sensor for detecting angular velocity. However, in these inertial sensors, in general, there is a temperature drift (offset). Therefore, it is difficult to directly use the output of the inertial sensor without modification as the detected result of the inertial sensor. Further, the temperature drift (offset) of the inertial sensor varies with the temperature and elapsed years.

Therefore, in JP-A-2015-179887 (Document 1), there is disclosed a temperature correction device for correcting the temperature drift (offset) using an output of a temperature sensor and a correction formula based on an output of the sensor after determination of a resting state in the sensor accompanied by the temperature drift.

However, in the temperature correction device described in Document 1, it is not achievable to accurately perform the correction of the temperature drift in a broad temperature range. Further, it is necessary for the inertial sensor to obtain the temperature drift correction value in the resting state, and in order to determine the resting state of the inertial sensor element, it is necessary to always obtain the output of the inertial sensor element. Therefore, the power consumption increases in the case of updating the correction data of the temperature drift.

In view of such a problem as described above, according to some aspects of the invention, it is possible to provide an inertial sensor element control device and a method of updating temperature compensation information of the inertial sensor element control device which is capable of accurately obtaining the temperature compensation information such as an offset correction value of the inertial sensor element with respect to a wide temperature range, and is capable of reducing the power consumption in the case of updating the correction data. Further, according to some aspects of the invention, it is possible to provide an inertial sensor, an electronic apparatus and a vehicle using the inertial sensor element control device.

SUMMARY

An advantage of some aspects of the invention is to solve at least a part of the problems described above, and the invention can be implemented as the following forms or application examples.

Application Example 1

An inertial sensor element control device according to this application example is an inertial sensor element control device to which an inertial sensor element having temperature characteristics can be connected, the inertial sensor element control device including a memory adapted to store temperature compensation information with respect to the temperature characteristics, and update history information of the temperature compensation information, an update determination circuit adapted to determine necessity of an update of the temperature compensation information based on a signal based on an output signal of a temperature sensor element and the update history information, a rest determination circuit adapted to determine whether or not the inertial sensor element is at rest, and an updating circuit adapted to perform an updating process of the temperature compensation information based on a determination result of the update determination circuit, a determination result of the rest determination circuit, a signal based on an output signal of the inertial sensor element, and a signal based on an output signal of the temperature sensor element.

The signal based on the output signal of the temperature sensor element can be the output signal itself of the temperature sensor element, and further, can also be a signal obtained by performing some treatment on the output signal of the temperature sensor element. Further, the signal based on the output signal of the inertial sensor element can be the output signal itself of the inertial sensor element, and further, can also be the signal obtained by performing some treatment on the output signal of the inertial sensor element.

The temperature compensation information is the correction information storing the offset correction value with respect to the temperature characteristics of the inertial sensor element, and can also be, for example, the table data such as a look-up table.

According to the inertial sensor element control device related to this application example, the inertial sensor element control device includes the update determination circuit for determining the necessity of the update of the temperature compensation information, the rest determination circuit for making the determination on whether or not the inertial sensor element is at rest, and the updating circuit for performing the updating process of the temperature compensation information. Then, the updating circuit for performing the updating process of the temperature compensation information performs the updating process of the temperature compensation information based on the result of the determination of the necessity of the update of the temperature compensation information determined by the update determination circuit, and the determination result of whether or not the inertial sensor element is at rest determined by the rest determination circuit. On this occasion, the update determination circuit determines the necessity of the updating process of the temperature compensation information based on the output signal of the temperature sensor element and the history information of the temperature compensation information. Therefore, it is possible for the update determination circuit to determine that the update of the temperature compensation information is necessary only to the necessary temperature. Therefore, it becomes possible to prevent the execution of the unnecessary updating process of the temperature compensation information. Therefore, it becomes possible to reduce the power consumption in the update of the correction data of the temperature compensation information.

Further, according to the inertial sensor element control device related to this application example, the rest determination circuit performs the determination on whether or not the inertial sensor element is at rest. The updating circuit performs the updating process of the temperature compensation information based on the determination result of whether or not the inertial sensor element is at rest determined by the rest determination circuit. In other words, the updating process performed by the updating circuit is performed when the inertial sensor element is at rest. Therefore, it becomes possible to accurately obtain the offset correction value of the inertial sensor element.

Further, according to the inertial sensor element control device related to this application example, the updating circuit performs the updating process of the temperature compensation information with the signal based on the output signal of the inertial sensor element described above and the signal based on the output signal of the temperature sensor element described above based on the result of the determination of the necessity of the update of the temperature compensation information determined by the update determination circuit, and the determination result of whether or not the inertial sensor element is at rest determined by the rest determination circuit. Therefore, it becomes possible to obtain the offset correction value in the broad temperature range based on the output of the temperature sensor element to update the temperature compensation information in the broad temperature range based on the offset correction value thus obtained. Therefore, it becomes possible for the inertial sensor element control device to perform the updating process of the temperature compensation information in the broad temperature range.

Application Example 2

In the inertial sensor element control device according to the application example described above, it is also possible that the update history information includes time information of the update of the temperature compensation information, and the update determination circuit determines the necessity of the update of the temperature compensation information based on the time information.

The time information is the information representing the most recent time when the temperature compensation information has been updated, and can also be the information representing, for example, time and date, date, season, and so on.

According to the inertial sensor element control device related to this application example, the update history information includes the time information of the update of the temperature compensation information. Then, the update determination circuit determines the necessity of the update of the temperature compensation information based on the time information included in the update history information. Therefore, it becomes possible for the update determination circuit to determine the necessity of the update of the temperature compensation information after figuring out the period from when the temperature compensation information has been updated at the previous time, the season in which the temperature compensation information has been updated at the previous time, and so on. Therefore, it becomes possible to prevent the unnecessary update of the temperature compensation information, and thus, it becomes possible to reduce the power consumption related to the updating process of the temperature compensation information. Therefore, it becomes possible to further reduce the power consumption in the update of the correction data of the temperature compensation information.

Application Example 3

In the inertial sensor element control device according to the application example described above, it is also possible that the update determination circuit predicts a temporal change of the signal based on the output signal of the temperature sensor element based on a first operation information signal input from an outside and the update history information, and determines the necessity of the update of the temperature compensation information based on a prediction result.

The first operation information signal can also be, for example, a signal including the information representing the operation configuration in the electronic apparatus, the vehicle and so on in which the inertial sensor element control device is used.

According to the inertial sensor element control device related to this application example, the update determination circuit predicts the temporal change based on the output signal of the temperature sensor element based on the first operation information signal of the apparatus in which the inertial sensor element control device is used. Thus, it becomes possible to predict the necessity of the update of the temperature compensation information over time. In other words, since it is possible to predict the necessity of the update of the temperature compensation information over time in advance to determine the necessity of the update of the temperature compensation information, it becomes possible to prevent the unnecessary update of the temperature compensation information. Therefore, it becomes possible to further reduce the power consumption in the update of the correction data of the temperature compensation information.

Application Example 4

In the inertial sensor element control device according to the application example described above, it is also possible that the rest determination circuit determines whether or not the inertial sensor element is at rest with a signal based on an output signal of the inertial sensor element.

According to the inertial sensor element control device related to this application example, since the rest determination circuit performs the stop determination of the inertial sensor element based on the output signal of the inertial sensor element, it becomes possible for the rest determination circuit to figure out the actual operation condition of the inertial sensor element to make the rest determination, and thus, the accuracy of the rest determination is further improved. Therefore, it becomes possible to more accurately obtain the offset correction value in the case in which the inertial sensor element is at rest.

Application Example 5

In the inertial sensor element control device according to the application example described above, it is also possible that the rest determination circuit obtains the signal based on an output signal of the inertial sensor element a plurality of times to determine whether or not the inertial sensor element is at rest based on a variation in the signal obtained the plurality of times.

According to the inertial sensor element control device related to this application example, since the rest determination circuit obtains the signal based on the output signal of the inertial sensor element a plurality of times, and makes the rest determination of the inertial sensor element based on the variation of the signal thus obtained, it becomes possible to reduce the false operation in the rest determination due to the noise or the like, and the accuracy of the rest determination is further improved. Therefore, it becomes possible to more accurately obtain the offset correction value in the case in which the inertial sensor element is at rest.

Application Example 6

In the inertial sensor element control device according to the application example described above, it is also possible that a plurality of the inertial sensor elements can be connected, and the rest determination circuit determines whether or not the plurality of inertial sensor elements is at rest with the signal based on some of the output signals of the plurality of inertial sensor elements.

According to the inertial sensor element control device related to this application example, it becomes possible for the rest determination circuit to make the rest determination of the plurality of inertial sensor elements using the signal based on the output signals of some inertial sensor elements of the plurality of inertial sensor elements in the inertial sensor element control device to which the plurality of inertial sensor elements is connected. Thus, it becomes possible to reduce the power consumption when the rest determination circuit makes the determination on whether or not the inertial sensor element is at rest. Therefore, it becomes possible to further reduce the power consumption in the update of the correction data of the temperature compensation information.

Application Example 7

In the inertial sensor element control device according to the application example described above, it is also possible that the plurality of inertial sensor elements includes a first inertial sensor element, and a second inertial sensor element higher in power consumption than the first inertial sensor element, and the rest determination circuit determines whether or not the plurality of inertial sensor elements is at rest with the signal based on the output signal of the first inertial sensor element.

According to the inertial sensor element control device related to this application example, it becomes possible for the rest determination circuit to make the rest determination of the plurality of inertial sensor elements using the signal based on the output signals of the inertial sensor element lower in power consumption out of the plurality of inertial sensor elements in the inertial sensor element control device to which the plurality of inertial sensor elements is connected. Thus, it becomes possible to reduce the power consumption when the rest determination circuit makes the determination on whether or not the inertial sensor element is at rest. Therefore, it becomes possible to further reduce the power consumption in the update of the correction data of the temperature compensation information.

Application Example 8

In the inertial sensor element control device according to the application example described above, it is also possible that the rest determination circuit determines whether or not the inertial sensor element is at rest based on a second operation information signal input from an outside.

The second operation information signal can also be, for example, a signal including the information representing the operation configuration in the electronic apparatus, the vehicle and so on in which the inertial sensor element control device is used. The second operation information signal can be the same signal as the first operation information signal, or can also be a different signal from the first operation information signal.

According to the inertial sensor element control device related to this application example, it becomes possible for the rest determination circuit to determine the rest based on the second operation information of the apparatus in which the inertial sensor element control device is used. Therefore, it becomes possible to reduce the false operation in the rest determination due to the noise or the like, and thus, the accuracy of the rest determination is further improved. Therefore, it becomes possible to accurately obtain the offset correction value in the case in which the inertial sensor element is at rest.

Application Example 9

In the inertial sensor element control device according to the application example described above, it is also possible that there is further included a usage determination circuit having a first operation mode, and a second operation mode lower in power consumption than the first operation mode, and adapted to determine whether or not the inertial sensor element is in use, and the usage determination circuit sets one of the first operation mode and the second operation mode based on a third operation information signal input from an outside.

The third operation information signal can also be a signal including the information representing the operation configuration such as the electronic apparatus or the vehicle in which the inertial sensor element control device is used. The third operation information signal can be the same signal as the first operation information signal, or can also be a different signal from the first operation information signal. Further, the third operation information signal can be the same signal as the second operation information signal, or can also be a different signal from the second operation information signal.

According to the inertial sensor element control device related to this application example, the usage determination circuit determines whether or not the inertial sensor element is used in the apparatus in which the inertial sensor element control device is used based on the third operation information signal, and sets the inertial sensor element control device to the second mode lower in power consumption in the case in which the inertial sensor element is not in use. Thus, it becomes possible to reduce the power consumption in the case in which the inertial sensor element is not in use.

Further, according to the inertial sensor element control device related to this application example, in the case in which the rest determination circuit determines whether or not the inertial sensor element is at rest, when the inertial sensor element is not in use, there is a high possibility that the inertial sensor element is at rest. Therefore, by setting the inertial sensor element control device to the second mode low in power consumption when the inertial sensor element is not in use, it is also possible to reduce the power consumption when the rest is determined or when updating the correction data of the temperature compensation information.

Application Example 10

In the inertial sensor element control device according to the application example described above, it is also possible that the updating process includes a process of storing a signal based on the output signal of the temperature sensor element, and a signal based on the output signal of the inertial sensor element in the memory as the temperature compensation information.

According to the inertial sensor element control device related to this application example, the temperature compensation information includes a signal based on the output signal of the temperature sensor element, and a signal based on the output signal of the inertial sensor element. Therefore, the correction value for correcting the inertial sensor element corresponds to the range in which the temperature sensor element and the inertial sensor element can be detected. Therefore, it becomes possible for the inertial sensor element control device to obtain the temperature compensation information in a broad temperature range to perform the updating process.

Application Example 11

In the inertial sensor element control device according to the application example described above, it is also possible that the inertial sensor element is a vibration type sensor element including a drive section and a detection section.

According to the inertial sensor element control device related to this application example, in the case in which the inertial sensor element is the vibration type sensor element having the drive section and the detection section, it becomes possible to accurately correct the offset (variation) due to the variation of the drive section and the detection section.

Application Example 12

An inertial sensor according to this application example includes any one of the inertial sensor element control devices described above, and the inertial sensor element described above.

According to the inertial sensor related to this application example, since the temperature compensation information such as the offset correction value of the inertial sensor element can accurately be obtained with respect to a broad temperature range in the inertial sensor element control device, it becomes possible to realize a high-precision inertial sensor.

Further, according to the inertial sensor related to this application example, it is possible to reduce the power consumption when updating the correction data of the temperature compensation information of the inertial sensor element, and it becomes possible to realize the inertial sensor low in power consumption.

Application Example 13

An electronic apparatus according to this application example includes the inertial sensor described above.

Application Example 14

A vehicle according to this application example includes the inertial sensor described above.

According to these application examples, since there is provided the inertial sensor accurately corrected, it becomes possible to realize the electronic apparatus and the vehicle high in reliability.

Application Example 15

A method of updating temperature compensation information of an inertial sensor element control device according to this application example includes steps of providing the inertial sensor element control device to which an inertial sensor element having temperature characteristics can be connected, and including a memory adapted to store temperature compensation information with respect to the temperature characteristics, and update history information of the temperature compensation information, determining necessity of an update of the temperature compensation information based on a signal based on an output signal of a temperature sensor element and the update history information, determining whether or not the inertial sensor element is at rest, and performing an updating process of the temperature compensation information based on a determination result of the necessity of the update of the temperature compensation information, a determination result on whether or not the inertial sensor element is at rest, a signal based on an output signal of the inertial sensor element, and a signal based on an output signal of the temperature sensor element.

According to the method of updating the temperature compensation information of the inertial sensor element control device related to this application example, by determining the necessity of the update of the temperature compensation information based on the signal based on the output signal of the temperature sensor element and the update history information, it is possible to determine that the update of the temperature compensation information at the unnecessary temperature is unnecessary. Therefore, it becomes possible to prevent the unnecessary updating process of the temperature compensation information. Therefore, it becomes possible to reduce the power consumption in the update of the correction data of the temperature compensation information.

Further, according to the method of updating the temperature compensation information of the inertial sensor element control device related to this application example, by making the determination on whether or not the inertial sensor element is at rest, the inertial sensor element is at rest when updating the temperature compensation information. Therefore, it becomes possible to accurately obtain the offset correction value of the inertial sensor element.

Further, the update of the temperature compensation information is performed with the signal based on an output signal of the inertial sensor element and the signal based on an output signal of the temperature sensor element based on the determination result of the necessity of the update of the temperature compensation information, and the determination result on whether or not the inertial sensor element is at rest. Therefore, the update of the temperature compensation information becomes possible in a broad temperature range based on the output of the temperature sensor element. Therefore, it becomes possible for the inertial sensor element control device to perform the updating process of the temperature compensation information in the broad temperature range.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some preferred embodiments of the invention will hereinafter be described in detail using the accompanying drawings. It should be noted that the embodiments described below do not unreasonably limit the contents of the invention as set forth in the appended claims. Further, all of the constituents described hereinafter are not necessarily essential elements of the invention.

It should be noted that in the embodiments described below, the description will be presented citing a physical quantity sensor (an internal sensor) including a sensor element (an inertial sensor element) and a sensor element control circuit (an inertial sensor element control device) to which the sensor element is connected as an example.

1. Physical Quantity Sensor (Inertial Sensor)

1.1 First Embodiment

Configuration of Physical Quantity Sensor

Figure 1:
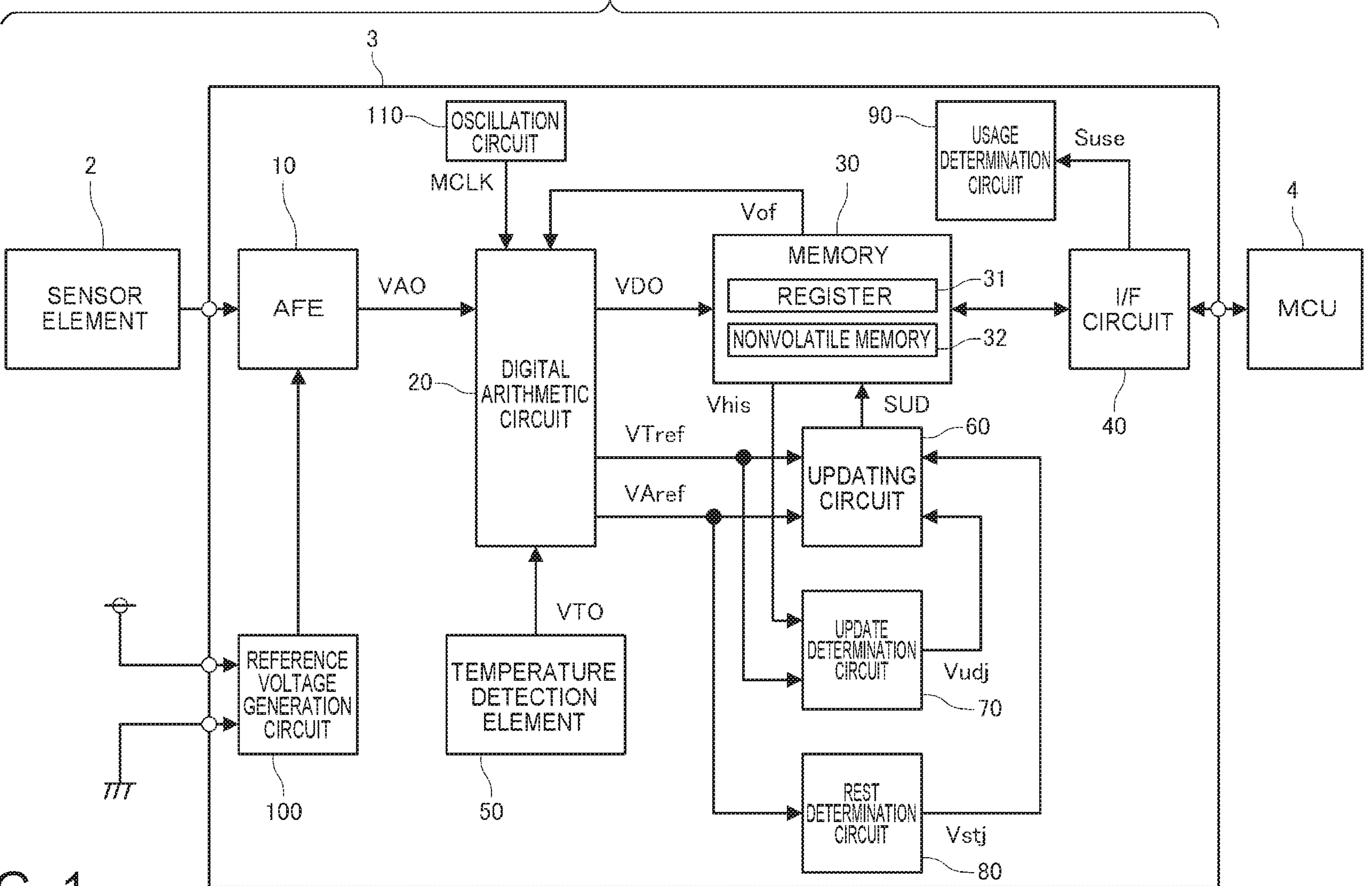
FIG. 1 is a functional block diagram of a physical quantity sensor according to a first embodiment of the invention.

FIG. 1 is a functional block diagram of a physical quantity sensor according to a first embodiment. The physical quantity sensor 1 according to the first embodiment is configured including a sensor element 2 for outputting an analog signal related to a physical quantity and a sensor element control circuit 3. It is also possible for the physical quantity sensor 1 to be configured further including an MCU (micro-control unit) 4 connected to the physical quantity sensor 1 to perform a variety of calculation processes and control processes.

The sensor element 2 (an example of the "inertial sensor element") is an element for detecting the physical quantity (in particular, inertial force such as angular velocity or acceleration) to convert the physical quantity into an electric signal, and outputting the electric signal. For example, the sensor element 2 can also be a vibrational sensor element including a piezoelectric type vibrator element or a capacitance detecting type vibrator element. In the sensor element 2, the electric signal obtained by converting the physical quantity (in particular, the inertial force such as angular velocity or acceleration) thus detected has a temperature characteristic to cause a variation of the voltage level corresponding to the ambient temperature.

In the physical quantity sensor 1 according to the first embodiment, the sensor element 2 has two detecting electrodes (not shown), namely a positive electrode and a negative electrode, and outputs a pair of differential detected signals from these detecting electrodes. Further, it is also possible for the sensor element 2 to output a single-ended detected signal.

The sensor element control circuit 3 (an example of the "inertial sensor element control device") can be connected to the sensor element 2, and outputs a drive signal for driving the sensor element 2. Further, the sensor element control circuit 3 performs amplification and correction of the electric signal output by the sensor element 2, and outputs the result as a physical quantity signal corresponding to the magnitude of the physical quantity (inertial force) detected by the sensor element 2.

The sensor element control circuit 3 is configured including an analog front-end (AFE) 10, a digital arithmetic circuit 20, a memory 30, an interface circuit (I/F circuit) 40, a temperature detection element 50, an updating circuit 60, an update determination circuit 70, a rest determination circuit 80, a usage determination circuit 90, a reference voltage generation circuit 100, and an oscillation circuit 110. The sensor element control circuit 3 can also be, for example, a single-chip integrated circuit (IC). It should be noted that the sensor element control circuit 3 can be provided with a configuration obtained by omitting or modifying some of these constituents, or adding other constituents.

The reference voltage generation circuit 100 generates a reference voltage or a reference current from a power supply voltage (e.g., 3.3 V) and the ground potential (0 V), and then supplies the reference voltage or the reference current to the analog front-end 10.

To the analog front-end 10, there is input the detected signal output by the sensor element 2.

Then, a physical quantity signal VAO, which is an analog signal with a voltage corresponding to the physical quantity (inertial force) detected by the sensor element 2, is output to the digital arithmetic circuit 20.

Figure 2:
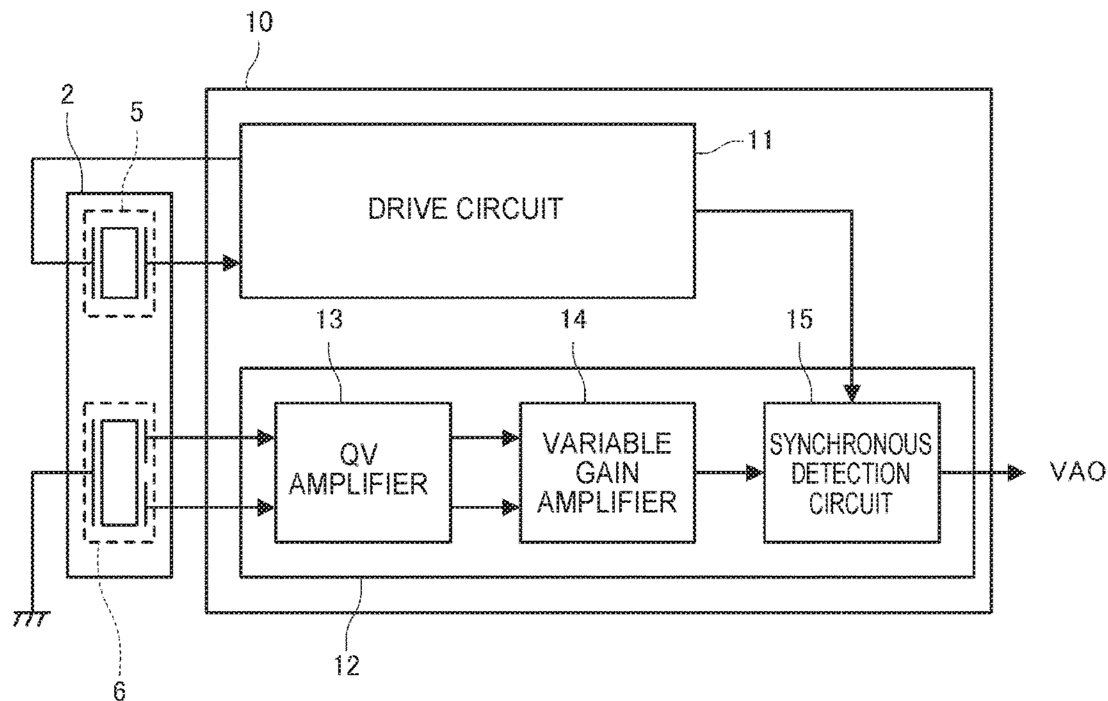
FIG. 2 is a diagram showing an example of an analog front-end of the physical quantity sensor according to the first embodiment.

FIG. 2 is a diagram showing an example of a configuration of the analog front-end 10. As shown in FIG. 2, in the physical quantity sensor 1 according to the first embodiment, the sensor element 2 has a drive section 5 and a detecting section 6. Further, the sensor element 2 is a vibratory sensor element in which the detection signal is output from the detecting section 6 in a state of driving the drive section 5.

The analog front-end 10 shown in FIG. 2 includes a drive circuit 11 and a detecting circuit 12. It should be noted that the analog front-end 10 can be provided with a configuration obtained by omitting or modifying some of these constituents, or adding other constituents.

The drive circuit 11 outputs a drive signal for driving the drive section 5 of the sensor element 2 to the drive section 5. On this occasion, in order to stably drive the drive section 5, the dive circuit 11 performs the control based on a feedback signal output from the drive section 5 so that the amplitude of the drive signal is kept constant. Further, the drive circuit 11 generates a detection signal at the same frequency as that of the drive signal, and outputs the detection signal to a synchronous detection circuit 15 provided to the detecting circuit 12.

The detecting circuit 12 includes a QV amplifier 13, a variable gain amplifier (programmable gain amplifier (PGA)) 14 and the synchronous detection circuit 15. It should be noted that the detecting circuit 12 can be provided with a configuration obtained by omitting or modifying some of these constituents, or adding other constituents.

The detected signals (differential alternating-current charge) output from the detecting section 6 of the sensor element 2 are input to the QV amplifier 13, and the QV amplifier 13 generates the differential signals with the voltage corresponding to the detected signals (the alternating-current charge).

The variable gain amplifier 14 differentially amplifies the differential signals output from the QV amplifier to output a signal in a desired voltage level. The differential signals output from the QV amplifier 13 are formed of two signals 180° different in phase from each other. Therefore, in the signal output from the variable gain amplifier 14, the in-phase components of the differential signals output from the QV amplifier 13 are canceled out, and the reversed-phase components thereof are summing-amplified.

The synchronous detection circuit 15 synchronously detects the physical quantity component included in the signal (detection target signal) output from the variable gain amplifier 14 using the detection signal output by the drive circuit 11. The synchronous detection circuit 15 can be configured as, for example, a circuit which directly outputs the detection target signal output from the variable gain amplifier 14 without modification in the case in which the detection signal is in the high level, and outputs a signal obtained by inverting the detection target signal output from the variable gain amplifier 14 with respect to the reference voltage in the case in which the detection signal is in the low level. The output signal of the synchronous detection circuit 15 corresponds to the physical quantity signal VAO described above.

Going back to FIG. 1, the temperature detection element 50 (an example of a "temperature sensor element") outputs a temperature signal VTO at a voltage level corresponding to the ambient temperature to the digital arithmetic circuit 20. The temperature detection element 50 can be a positive type, in which the higher the temperature is, the higher the output voltage is, or can also be a negative type, in which the higher the temperature is, the lower the output voltage is. The temperature detection element 50 can also be a circuit for outputting, for example, a voltage (PTAT (proportional to absolute temperature) voltage) proportional to the absolute temperature.

The oscillation circuit 110 functions as a clock generation circuit for generating a master-clock signal MCLK to output the master-clock signal MCLK to the digital arithmetic circuit 20. The oscillation circuit 110 is configured as, for example, a ring oscillator or a CR oscillation circuit.

The digital arithmetic circuit 20 converts the physical quantity signal VAO output from the analog front-end 10 into a digital signal, then corrects the digital signal based on a temperature signal VTO output from the temperature detection element 50, and then outputs the result to the memory 30 as physical quantity data VDO of the digital signal. Further, the digital arithmetic circuit 20 outputs temperature data VTref to the updating circuit 60 and the update determination circuit 70. Further, the digital arithmetic circuit 20 outputs sensor element detection data VTref to the updating circuit 60 and the rest determination circuit 80.

Figure 3:
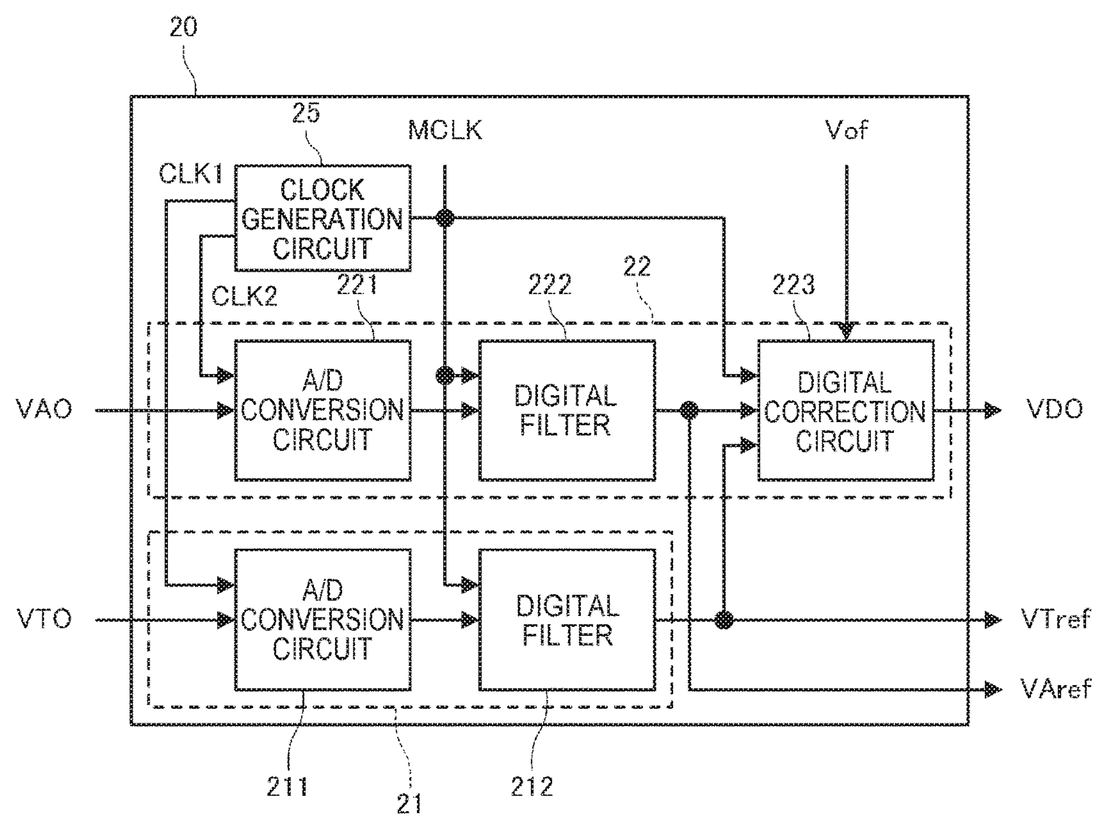
FIG. 3 is a diagram showing a configuration of a digital arithmetic circuit of the physical quantity sensor according to the first embodiment.

FIG. 3 is a diagram showing a configuration of the digital arithmetic circuit 20. The digital arithmetic circuit 20 includes a first physical quantity arithmetic circuit 21, a second physical quantity arithmetic circuit 22, and a clock generation circuit 25.

The clock generation circuit 25 generates and then outputs a sampling clock signal CLK1 for an A/D conversion circuit 211 included in the first physical quantity arithmetic circuit 21, and a sampling clock signal CLK2 for an A/D conversion circuit 221 included in the second physical quantity arithmetic circuit 22 based on the master-clock signal MCLK (the output signal of the oscillation circuit 110).

The first physical quantity arithmetic circuit 21 includes the A/D conversion circuit 211 and a digital filter 212. The temperature signal VTO is input to the first physical quantity arithmetic circuit 21, and the first physical quantity arithmetic circuit 21 outputs the temperature data VTref.

The A/D conversion circuit 211 converts the temperature signal VTO into a digital signal in sync with the sampling clock signal CLK1.

The digital filter 212 performs a filtering process of the signal (the digital signal of the temperature signal VTO) output from the A/D conversion circuit 211. Then, the signal (the signal based on the digital signal of the temperature signal VTO) on which the filtering process has been performed in the digital filter 212 is output from the digital arithmetic circuit 20 as the temperature data VTref. Further, the signal (the signal based on the digital signal of the temperature signal VTO) on which the filtering process has been performed in the digital filter 212 is input to a digital correction circuit 223 included in the second physical quantity arithmetic circuit 22.

Here, the temperature data VTref is the signal obtained by converting the temperature signal VTO output by the temperature detection element 50 into a digital signal, and then outputting the digital signal via the digital filter 212. In other words, the temperature data VTref is a signal based on the output signal of the temperature detection element 50.

The second physical quantity arithmetic circuit 22 includes the A/D conversion circuit 221, a digital filter 222, and a digital correction circuit 223. The physical quantity signal VAO is input to the second physical quantity arithmetic circuit 22, and the second physical quantity arithmetic circuit 22 outputs the physical quantity data VDO and the sensor element detection data VTref.

The A/D conversion circuit 221 converts the physical quantity signal VAO into a digital signal in sync with the sampling clock signal CLK2.

The digital filter 222 performs a filtering process of the signal (the digital signal of the physical quantity signal VAO) output from the A/D conversion circuit 221. Then, the signal (the signal based on the digital signal of the physical quantity signal VAO) on which the filtering process has been performed in the digital filter 222 is output from the digital arithmetic circuit 20 as the sensor element detection data VTref.

Further, the signal (the signal based on the digital signal of the physical quantity signal VAO) on which the filtering process has been performed in the digital filter 222 is input to the digital correction circuit 223.

Here, the sensor element detection data VTref is a signal obtained by converting the detected signal output by the sensor element 2 into the physical quantity signal VAO in the analog front-end 10, further converting the physical quantity signal VAO into a digital signal, and then outputting the digital signal via the digital filter 222. In other words, the sensor element detection data VTref is a signal based on the output signal of the sensor element 2.

To the digital correction circuit 223, there are input a temperature correction signal Vof including temperature compensation information output from the memory 30 (see FIG. 1) described later, the signal (the signal based on the digital signal of the physical quantity signal VAO) output from the digital filter 222, and the signal (the signal based on the digital signal of the temperature signal VTO) output from the digital filter 212. Then, the digital correction circuit 223 corrects the signal (the signal based on the digital signal of the physical quantity signal VAO) output from the digital filter 222 based on the temperature correction signal Vof and the signal based on the temperature signal VTO, and then outputs the signal thus corrected as the physical quantity data VDO of the digital signal.

Due to the above, the digital arithmetic circuit 20 outputs the sensor element detection data VTref which has not been corrected with the signal based on the temperature signal VTO, the physical quantity data VDO which has been corrected with the signal based on the temperature signal VTO, and the temperature data VTref.

Going back to FIG. 1, the memory 30 has a register 31 and a nonvolatile memory 32. In the register 31, there is set the information of an address and data used for communication with an external device via the interface circuit 40. Further, in the register 31, there is stored the physical quantity data VDO output from the digital arithmetic circuit 20.

In the nonvolatile memory 32, there are stored a variety of types of trimming data (e.g., adjustment data and a correction data) such as temperature compensation information and update history information of the temperature compensation information for correcting the output signal of the digital filter 222 with the signal based on the digital signal of the temperature signal VTO, and a variety of types of information for establishing the communication with the external device via the interface circuit 40. The nonvolatile memory 32 can be formed of, for example, an MONOS (metal oxide nitride oxide silicon) memory or an electrically erasable programmable read-only memory (EEPROM).

The temperature compensation information is information for correcting the output signal of the digital filter 222 with the temperature data VTref. As the temperature information, there is stored, for example, an offset level (a value of the physical quantity data VDO based on the detected signal output from the sensor element 2 when the physical quantity (inertial force) applied to the sensor element 2 is zero) of the sensor element 2. Further, as the update history information of the temperature compensation information, there are stored, for example, time information when the temperature compensation information has been updated, the number of updates of the temperature compensation information, and an update frequency thereof. For example, the temperature compensation information can also be the offset levels (table data) of the sensor element 2 corresponding respectively to the values of the temperature data VTref, and can also be, for example, the offset levels corresponding to the temperature values incremented by 1° C. Further, the time information includes the information of time, date, season when the temperature compensation information has been updated.

The memory 30 outputs the temperature compensation information to the digital correction circuit 223 included in the digital arithmetic circuit 20 as a temperature correction signal Vof. In other words, the digital correction circuit 223 corrects the output signal of the digital filter 222 based on the temperature correction signal Vof based on the temperature compensation information and the temperature signal VTO output by the temperature detection element 50, and then outputs the physical quantity data VDO. Further, the memory 30 outputs the update history information of the temperature compensation information to the update determination circuit 70 as an update history signal Vhis.

The interface circuit 40 is a circuit for communicating with an external device (e.g., the MCU 4). In the communication via the interface circuit 40, for example, the external device functions as a master, and the physical quantity sensor 1 (the sensor element control circuit 3) functions as a slave. Further, the external device is capable of writing data at a predetermined address of the register 31 and reading out data from a predetermined address of the register 31 via the interface circuit 40. As described above, the physical quantity sensor 1 (the sensor element control circuit 3) is configured so as to be able to output the physical quantity data VDO in response to a request from the external device. It should be noted that the interface circuit 40 is configured as, for example, an SPI (serial peripheral interface) interface circuit or an I2C (inter-integrated circuit) interface circuit.

Further, it is also possible to input a signal representing an operating state of an apparatus (e.g., an electronic apparatus or a vehicle) constituted by the physical quantity sensor 1 (the sensor element control circuit 3) and the external device to the interface circuit 40. In the case in which, for example, the apparatus is an electronic apparatus such as a cellular phone (a smartphone), the signal representing the operating state of the apparatus includes a signal representing the operating state such as whether or not the electronic apparatus such as a cellular phone (a smartphone) is on charging, whether or not a camera is in use, or whether or not a game is in use. Further, in the case in which, for example, the external device is a vehicle such as a car, there is included the signal representing the operating state such as whether or not the engine has just been started, or whether or not an acceleration operation is in operation. Thus, the physical quantity sensor 1 (the sensor element control circuit 3) determines a prediction of the operation, whether or not the sensor is in use, and so on based on the operation information of the apparatus (e.g., the electronic apparatus and the vehicle) used. The interface circuit 40 outputs the signal representing the operating state of the apparatus input from the external device (e.g., the MCU 4) to the usage determination circuit 90 as a usage information signal Suse. It should be noted that the usage information signal Suse output by the interface circuit 40 can also be a signal representing the operating state of the apparatus, or can also be a signal instructing the process (control) performed by the usage determination circuit 90 in accordance with the operating state of the apparatus.

To the usage determination circuit 90, the usage information signal Suse (an example of a "third operation information signal") which is one of the signals representing the operating state of the external apparatus is input from the interface circuit 40. The usage determination circuit 90 determines whether or not the sensor element 2 is in use based on the usage information signal Suse. In the case in which, for example, the apparatus in which the physical quantity sensor 1 is used is a digital camera (the electronic apparatus), and the usage information signal Suse is a signal representing the fact that shooting is in process, there is a possibility that the sensor element 2 is used for an image stabilization function or the like. Therefore, the usage determination circuit 90 determines that the sensor element 2 is in use. Further, in the case in which the apparatus in which the physical quantity sensor 1 is used is a digital camera (the electronic apparatus), and the usage information signal Suse is a signal representing the fact that charging is in process, it is conceivable that the digital camera (the electronic apparatus) is not in use. Therefore, the usage determination circuit 90 determines that the sensor element 2 is not in use.

Then, in the case in which the usage determination circuit 90 has determined that the sensor element 2 is not in use based on the usage information signal Suse, the physical quantity sensor 1 (the sensor element control circuit 3) makes the transition from an operating mode (an example of a "first operation mode") in which the sensor element 2 is driven to a sleep mode (an example of a "second operation mode") low in power consumption.

The update determination circuit 70 determines the necessity of the update of the temperature compensation information stored in the memory 30 based on the temperature data VTref input from the digital arithmetic circuit 20, and the update history signal Vhis input from the memory 30, and then outputs an update determination signal Vudj to the updating circuit 60.

In detail, the update determination circuit 70 figures out when the offset level corresponding to the value (the current temperature) of the temperature data VTref has been updated in the temperature compensation information (the table data) stored in the memory 30 based on the time information included in, for example, the update history signal Vhis and the temperature data VTref. Then, in the case in which the update of the temperature compensation information has been performed within a predetermined period from the present (in the case in which the difference between the current time and the most recent update time is within a predetermined range), the update determination circuit 70 determines that the update of the temperature compensation information is unnecessary, and makes the update determination signal Vudj output to the updating circuit 60 inactive. Further, in the case in which the update of the temperature compensation information has not been performed within the predetermined period from the present (in the case in which the difference between the current time and the most recent update time is not within the predetermined range), the update determination circuit 70 determines that the update of the temperature compensation information is necessary, and activates the update determination signal Vudj output to the updating circuit 60.

The rest determination circuit 80 determines whether or not the sensor element 2 is at rest based on the sensor element detection data VTref input from the digital arithmetic circuit 20, and then outputs a rest determination signal Vstj to the updating circuit 60.

For example, the rest determination circuit 80 obtains the sensor element detection data VTref a plurality of times. Then, in the case in which a variation in the sensor element detection data VTref obtained a plurality of times is equal to or lower than a predetermined value, the rest determination circuit 80 determines that the sensor element 2 is at rest. In detail, the rest determination circuit 80 obtains the sensor element detection data VTref at arbitrary time t, and further obtains the sensor element detection data VTref at time t+1. Then, in the case in which a difference between the sensor element detection data VTref obtained at the time t and the sensor element detection data VTref obtained at the time t+1 is equal to or lower than a predetermined value, the rest determination circuit 80 determines that the sensor element 2 is at rest. It should be noted that it is also possible for the rest determination circuit 80 to obtain the sensor element detection data VTref three or more times, and determine whether or not the sensor element 2 is at rest based on the average value of the respective differences. Further, it is also possible for the rest determination circuit 80 to obtain the sensor element detection data VTref a plurality of times, and determine whether or not the sensor element 2 is at rest based on a variation of the deviation (a difference from a reference value) from the reference value (e.g., 0).

The rest determination circuit 80 makes the rest determination signal Vstj inactive in the case in which the rest determination circuit 80 has determined that the sensor element 2 is not at rest, or activates the rest determination signal Vstj in the case in which the rest determination circuit 80 has determined that the sensor element 2 is at rest.

The updating circuit 60 makes the determination on whether or not the temperature compensation information stored in the memory 30 is to be updated based on the update determination signal Vudj and the rest determination signal Vstj. Then, in the case in which the updating circuit 60 has determined that the temperature compensation information is to be updated, the updating circuit 60 stores an update signal SUD based on the temperature data VTref and the sensor element detection data VTref input to the updating circuit 60 to the memory 30.

In detail, in the case in which the update determination signal Vudj is active, and the rest determination signal Vstj is active, the updating circuit 60 stores the temperature data VTref and the sensor element detection data VTref input to the updating circuit 60 to the memory 30 as the update signal SUD. In the case in which the temperature values stored in the temperature compensation information (the table data) are discrete data incremented by 1° C., it is possible for the temperature data VTref to be values rounded, rounded down, or rounded out so as to be the discrete data incremented by 1° C., or to be values interpolated from the adjacent measurement results so as to be the data incremented by 1° C. It should be noted that the memory 30 can also store the update history information such as the update time information, the number of times of the update, the frequency of the update in accordance with the update of the temperature compensation information.

As described above, in the physical quantity sensor according to the first embodiment, since the update determination circuit 70 determines the necessity of the update (an example of an "updating process") of the temperature compensation information based on the update history information and the temperature data VTref, execution of the unnecessary update by the updating circuit 60 is reduced.

Further, the rest determination circuit 80 makes the determination on whether or not the sensor element 2 is at rest based on the output signal of the sensor element 2. In other words, the rest determination circuit 80 makes the determination on whether or not the sensor element 2 is at rest based on the actual operating state of the sensor element 2. Therefore, it becomes possible for the rest determination circuit 80 to accurately detect (determine) whether or not the sensor element 2 is at rest. Further, the rest determination circuit 80 obtains the output signal of the sensor element 2 a plurality of times (twice in the first embodiment), and then makes the determination on whether or not the sensor element 2 is at rest based on the average value of the variations of the output signal of the sensor element 2 thus obtained. Thus, it becomes possible for the rest determination circuit 80 to more accurately detect (determine) whether or not the sensor element 2 is at rest.

In the case in which the update determination circuit has determined that the update of the temperature compensation information is necessary, and at the same time, the rest determination circuit 80 has determined that the sensor element 2 is at rest, the updating circuit 60 outputs the temperature data VTref and the sensor element detection data VTref as the update signal SUD to store the update signal SUD to the memory 30 as the temperature compensation information. The sensor element detection data VTref on this occasion is a value obtained in the case in which the rest determination circuit 80 has accurately determined that the sensor element 2 is at rest. Therefore, the sensor element detection data VTref output by the updating circuit 60 as the update signal SUD becomes the value small in error with respect to the true value of the offset level of the sensor element 2.

According to the process described above, the update of the temperature compensation information in the physical quantity sensor 1 according to the first embodiment is not casually performed, and it becomes possible to perform the update of the accurate temperature compensation information in a broad temperature range corresponding to the detecting level of the temperature detection element 50.

It should be noted that it is preferable for the determination on the necessity of the update of the temperature compensation information and the update of the temperature compensation information to be performed in the case in which it has been determined by the usage determination circuit 90 that the sensor element 2 is not in use. In the case in which the usage determination circuit 90 has determined that the sensor element 2 is not in use, there is a high possibility that the sensor element 2 is at rest. Therefore, it becomes possible to reduce the casual determination on the necessity of the update of the temperature compensation information.

Further, as described above, in the case in which it has been determined in the usage determination circuit 90 that the sensor element 2 is not in use, the sensor element control circuit 3 makes the transition to the sleep mode. Therefore, for example, by making the sensor element control circuit 3 perform a so-called intermittent operation of making the transition from the sleep mode to the operating mode to make the determination on the necessity of the update of the temperature compensation information and the update of the temperature compensation information, and then making the transition to the sleep mode once again, it becomes possible to reduce the power consumption necessary for the determination on the necessity of the update of the temperature compensation information and the update of the temperature compensation information.

Method of Updating Temperature Compensation Information

Here, the method of determining the necessity of the update of the temperature compensation information and the method of updating the temperature compensation information performed by the updating circuit 60, the update determination circuit 70, and the rest determination circuit 80 will be described using FIG. 4 and FIG. 5.

Figure 4:
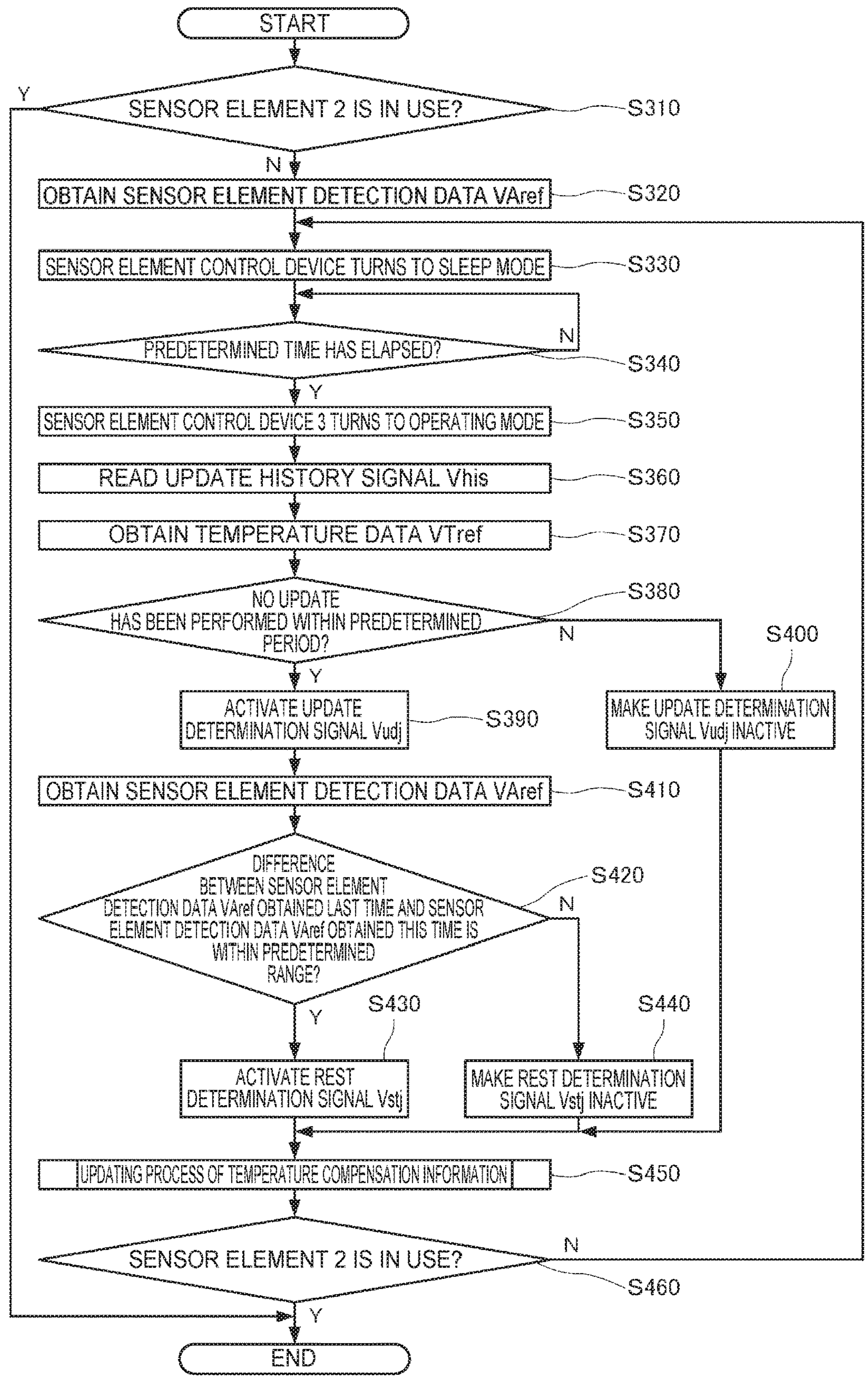
FIG. 4 is a flowchart showing an example of a method of determining necessity of an update of temperature compensation information of the physical quantity sensor according to the first embodiment, and a method of updating the temperature compensation information.

FIG. 4 is a flowchart showing an example of the method of determining the necessity of the update of the temperature compensation information, and the method of updating the temperature compensation information.

In the present embodiment, firstly, the usage determination circuit 90 makes (step S310) the determination on whether or not the sensor element 2 is in use. As described above, for example, the usage determination circuit 90 makes the determination on whether or not the sensor element 2 is in use based on a signal representing whether or not the sensor element 2 is in use. Further, it is also possible for the usage determination circuit 90 to make the determination on whether or not the sensor element 2 is in use using a signal based on the output signal of the sensor element 2.

In the usage determination circuit 90, in the case in which it has been determined that the sensor element 2 is in use (Y in the step S310), the update of the temperature compensation information is not performed. In contrast, in the usage determination circuit 90, in the case in which it has been determined that the sensor element 2 is not in use (N in the step S310), the rest determination circuit 80 obtains (step S320) the sensor element detection data VTref output from the digital arithmetic circuit 20. On this occasion, the rest determination circuit 80 temporarily stores the sensor element detection data VTref to a register or the like.

After the rest determination circuit 80 obtains the sensor element detection data VTref output from the digital arithmetic circuit 20, the physical quantity sensor 1 (the sensor element control circuit 3) makes the transition (step S330) to the sleep mode.

After the transition to the sleep mode, the physical quantity sensor 1 (the sensor element control circuit 3) waits (step S340) for elapse of predetermined time. Then, when the predetermined time elapses (Y in the step S340) after the transition of the physical quantity sensor 1 (the sensor element control circuit 3) to the sleep mode, the physical quantity sensor 1 (the sensor element control circuit 3) makes the transition (step S350) to the operating mode. Here, the predetermined time can be set in a range from several seconds to several hours. Further, the predetermined time can also be set based on the usage information signal Suse input to the usage determination circuit 90 via the interface circuit 40.

After the transition of the physical quantity sensor 1 (the sensor element control circuit 3) to the operating mode, the update determination circuit 70 reads (step S360) the update history signal Vhis representing the update history information stored in the memory 30. As described above, the update history information includes the signal representing the time information representing the time when the temperature compensation information has been updated, the number of times of the update of the temperature compensation information, and the update frequency.

Further, the update determination circuit 70 obtains (step S370) the temperature data VTref.

Then, the update determination circuit 70 figures out when the offset level corresponding to the value (the current temperature) of the temperature data VTref has been updated based on the time information included in the update history signal Vhis and the temperature data VTref. Then, the update determination circuit 70 makes (step S380) the determination on whether or not the update of the temperature compensation information has been performed within a predetermined period from the present.

In the case in which the update determination circuit has determined that the update of the temperature compensation information has not been performed within the predetermined period from the present (Y in the step S380), the update determination circuit 70 activates (step S390) the update determination signal Vudj. In contrast, in the case in which the update determination circuit 70 has determined that the update of the temperature compensation information has been performed within the predetermined period from the present (N in the step S380), the update determination circuit 70 makes (step S400) the update determination signal Vudj inactive. In the present embodiment, in the case of making the update determination signal Vudj inactive (step S400), it is assumed that the determination on whether or not the sensor element 2 is at rest (step S420) is not made, but this is not a limitation. It should be noted that as described in the present embodiment, since the update determination circuit 70 does not make the determination (step S420) on whether or not the sensor element 2 is at rest in the case in which the update determination circuit 70 makes the update determination signal Vudj inactive (step S400), it becomes possible to further eliminate an unnecessary process, and thus, it becomes possible to further reduce the power consumption when updating the temperature compensation information of the physical quantity sensor 1 (the sensor element control circuit 3).

After the update determination signal Vudj is activated, the rest determination circuit 80 obtains (step S410) the sensor element detection data VTref. On this occasion, the rest determination circuit 80 temporarily stores the sensor element detection data VTref to a register or the like different from the register or the like storing the data in the step S320.

Then, the rest determination circuit 80 makes (step S420) the determination on whether or not the difference between the sensor element detection data VTref stored in the step S320 and the sensor element detection data VTref stored in the step S410 is within a predetermined range.

In the case in which the difference between the sensor element detection data VTref stored in the step S320 and the sensor element detection data VTref stored in the step S410 is within the predetermined range (Y in the step S420), the rest determination circuit 80 determines that the sensor element 2 is at rest, and activates (step S430) the rest determination signal Vstj. In contrast, in the case in which the difference between the sensor element detection data VTref stored in the step S320 and the sensor element detection data VTref stored in the step S410 is not within the predetermined range (N in the step S420), the rest determination circuit 80 determines that the sensor element 2 is not at rest, and makes (step S440) the rest determination signal Vstj inactive.

The updating circuit 60 performs (step S450) the updating process of the temperature compensation information. The details of the updating process of the temperature compensation information will be described using FIG. 5.

The updating circuit 60 makes (step S451) the determination on whether or not the update determination signal Vudj is active. In the case in which the update determination signal Vudj is not active (is inactive) (N in the step S451), the updating circuit 60 terminates the updating process without performing the update of the temperature compensation information. In contrast, in the case in which the update determination signal Vudj is active (Y in the step S451), the updating circuit 60 makes the determination on whether or not the rest determination signal Vstj is active (step S452). Then, in the case in which the rest determination signal Vstj is not active (in inactive) (N in the step S452), the updating circuit 60 terminates the updating process without performing the update of the temperature compensation information, and in the case in which the rest determination signal Vstj is active (Y in the step S452), the updating circuit 60 obtains (step S453) the temperature data VTref and the sensor element detection data VTref as the update data of the temperature compensation information.

In other words, in the case in which both of the update determination signal Vudj and the rest determination signal Vstj are active, the updating circuit 60 obtains the temperature data VTref and the sensor element detection data VTref. Thus, the determination (step S451) on whether or not the update determination signal Vudj is active and the determination (step S452) on whether or not the rest determination signal Vstj is active can also be made in reverse order.

Then, the updating circuit 60 outputs the signal including the temperature data VTref, the sensor element detection data VTref, and the update history information to the memory 30 as the update signal SUD to store the signal to the memory 30 as the temperature compensation information together with the update history information (step S454).

Figure 5:
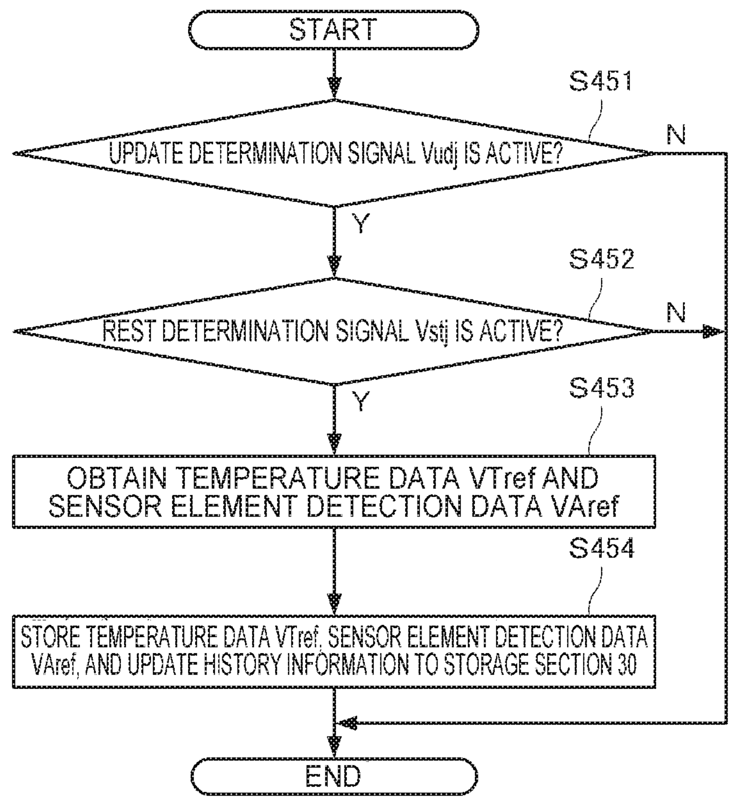
FIG. 5 is a flowchart showing an example of a process of updating the temperature compensation information of the physical quantity sensor according to the first embodiment.

Going back to FIG. 5, after the updating process of the temperature compensation information is completed, the usage determination circuit 90 makes (step S460) the determination on whether or not the sensor element 2 is in use. In the case in which the usage determination circuit 90 has determined that the sensor element 2 is in use (Y in the step S460), the update of the temperature compensation information is terminated. In contrast, in the case in which the usage determination circuit 90 has determined that the sensor element 2 is not in use (N in the step S460), the physical quantity sensor 1 (the sensor element control circuit 3) turns to the sleep mode (step S330). Then, after the predetermined time elapses (step S340), the physical quantity sensor 1 (the sensor element control circuit 3) turns to the operating mode (step S350), and performs the updating process of the temperature compensation information (the step S360 through the step S450) once again.

On this occasion, the sensor element detection data VTref to be obtained by the rest determination circuit 80 in the step S410 is temporarily stored in the register or the like different from the register or the like storing the sensor element detection data VTref having been obtained at the previous time by the rest determination circuit 80 in the step S410. Then, the rest determination circuit 80 compares (step S420) the sensor element detection data VTref having been obtained at the previous time and the sensor element detection data VTref having been obtained this time with each other to thereby make the rest determination of the sensor element 2.

As described above, the method of determining the necessity of the update of the temperature compensation information and updating the temperature compensation information according to the first embodiment includes a step of determining the necessity of the update of the temperature compensation information based on the update history signal Vhis representing the update history information of the temperature compensation information and the temperature data VTref, a step of determining whether or not the sensor element 2 is at rest, and a step of outputting the update signal SUD including the temperature data VTref, the sensor element detection data VTref, and the update history information to the memory 30 to store the update signal SUD to the memory 30, based on the determination results of whether or not the necessity of the update of the temperature compensation information and the sensor element 2 is at rest.

Functions and Advantages

As described hereinabove, according to the physical quantity sensor 1 (the sensor element control circuit 3) related to the first embodiment, the sensor element control circuit 3 includes the update determination circuit 70 for determining the necessity of the update of the temperature compensation information, the rest determination circuit 80 for making the determination on whether or not the sensor element 2 is at rest, and the updating circuit 60 for performing the updating process of the temperature compensation information. Then, the updating circuit 60 for performing the updating process of the temperature compensation information starts the updating process of the temperature compensation information based on the update determination signal Vudj representing the result of the determination of the necessity of the update of the temperature compensation information determined by the update determination circuit 70, and the rest determination signal Vstj representing the determination result on whether or not the inertial sensor element is at rest determined by the rest determination circuit 80. On this occasion, the update determination circuit 70 determines the necessity of the update of the temperature compensation information based on the temperature data VTref based on the output signal of the temperature detection element 50 and the update history signal Vhis of the temperature compensation information. Therefore, it is possible for the update determination circuit 70 to determine that the update of the temperature compensation information at the temperature at which the update of the temperature compensation information is unnecessary will not be performed. Therefore, it becomes possible to prevent the unnecessary update of the temperature compensation information, and thus, it becomes possible to reduce the power consumption related to the updating process of the temperature compensation information. Therefore, it becomes possible to reduce the power consumption in the update of the temperature compensation information.

Further, according to the physical quantity sensor 1 (the sensor element control circuit 3) of the first embodiment, the rest determination circuit 80 makes the determination on whether or not the sensor element 2 is at rest, and the updating circuit 60 performs the updating process of the temperature compensation information based on the rest termination signal Vstj representing the determination result on whether or not the sensor element 2 is at rest determined by the rest determination circuit 80. In other words, the updating process performed by the updating circuit 60 is performed when the sensor element 2 is at rest. Therefore, the correction value of the sensor element 2 is accurately recorded in the temperature compensation information.

Further, according to the physical quantity sensor 1 (the sensor element control circuit 3) of the first embodiment, the updating circuit 60 performs the updating process of the temperature compensation information with the sensor element detection data VTref and the temperature data VTref based on the update determination signal Vudj representing the result of the determination of the necessity of the update of the temperature compensation information determined by the update determination circuit 70, and the rest determination signal Vstj representing the determination result on whether or not the inertial sensor element is at rest determined by the rest determination circuit 80. Therefore, regarding the temperature compensation information, the update of the temperature compensation information becomes possible in a broad temperature range based on the temperature data VTref. Therefore, it becomes possible for the sensor element control circuit 3 to update the temperature compensation information in a broad temperature range.

According to the physical quantity sensor 1 (the sensor element control circuit 3) of the first embodiment, the update history information includes the time information of the time when the temperature compensation information has been updated. Then, the update determination circuit 70 determines the necessity of the update of the temperature compensation information based on the time information included in the update history information. Therefore, it becomes possible for the update determination circuit 70 to determine the necessity of the update of the temperature compensation information taking the period from when the temperature compensation information has been updated at the previous time, the season in which the temperature compensation information has been updated at the previous time, and so on into consideration. Thus, it becomes possible to prevent the unnecessary update of the temperature compensation information, and thus, it becomes possible to reduce the power consumption related to the updating process of the temperature compensation information. Therefore, it becomes possible to further reduce the power consumption in the update of the temperature compensation information.

According to the physical quantity sensor 1 (the sensor element control circuit 3), the rest determination circuit 80 obtains the signal (the sensor element detection data VTref) based on the output signal of the sensor element 2 a plurality of times, and then makes the determination on whether or not the sensor element 2 is at rest based on the variations of the signal thus obtained. Therefore, it becomes possible to reduce an erroneous operation in the rest determination due to noises or the like, and thus, the accuracy of the rest determination is further improved. Therefore, it becomes possible to accurately obtain the correction value in the case in which the sensor element 2 is at rest.

1.2 Second Embodiment

The physical quantity sensor 1 according to a second embodiment will hereinafter be described. In the physical quantity sensor 1 according to the second embodiment, the description will be presented with a focus on the contents in which the second embodiment is different from the first embodiment, and the description redundant to the first embodiment will be omitted. It should be noted that in the physical quantity sensor 1 according to the second embodiment, the description will be presented with the constituents substantially the same as those of the physical quantity sensor according to the first embodiment denoted by the same reference symbols.

In the physical quantity sensor 1 according to the second embodiment, a first operation information signal Sact1 is input to the update determination circuit 70 from the external device of the physical quantity sensor 1 via the interface circuit 40. The physical quantity sensor 1 according to the second embodiment is different from the physical quantity sensor 1 according to the first embodiment in the point that the update determination circuit 70 determines the necessity of the update of the temperature compensation information based on the first operation information signal Sact1 in addition to the temperature data VTref and the update history signal Vhis.

Further, in the physical quantity sensor 1 according to the second embodiment, a second operation information signal Sact2 is input to the rest determination circuit 80 from the external device of the physical quantity sensor 1 via the interface circuit 40. The physical quantity sensor 1 according to the second embodiment is different from the physical quantity sensor 1 according to the first embodiment in the point that the rest determination circuit 80 makes the determination on whether or not the sensor element 2 is at rest based on the second operation information signal Sact2.

Configuration of Physical Quantity Sensor

The configuration of the physical quantity sensor 1 according to the second embodiment will be described using FIG. 6.

Figure 6:
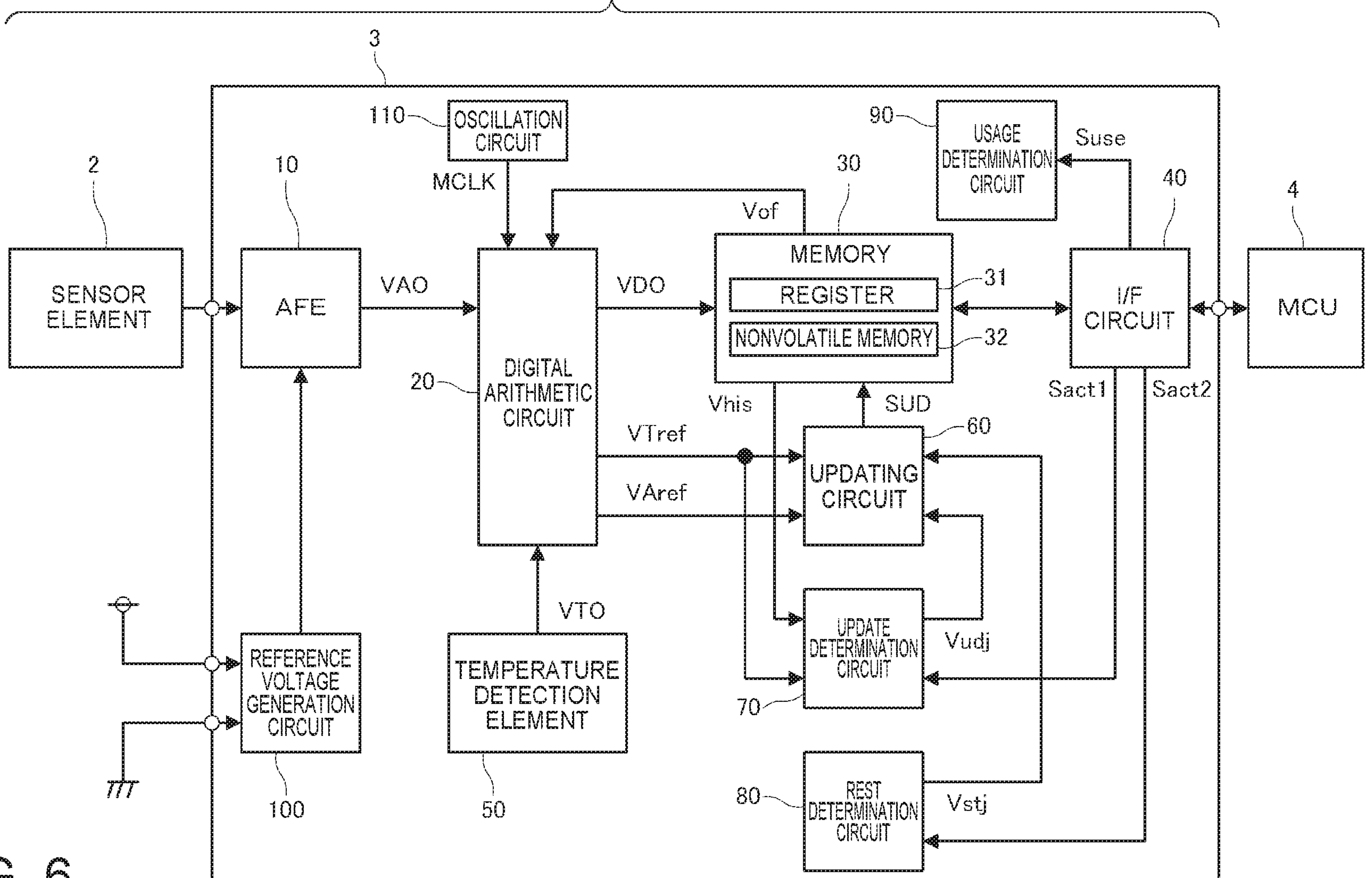
FIG. 6 is a functional block diagram of a physical quantity sensor according to a second embodiment of the invention.

FIG. 6 is a functional block diagram of the physical quantity sensor 1 according to the second embodiment.

Similarly to the physical quantity sensor 1 according to the first embodiment, the physical quantity sensor 1 according to the second embodiment is configured including the sensor element 2 for outputting an analog signal related to a physical quantity and the sensor element control circuit 3. It is also possible for the physical quantity sensor 1 to be configured further including an MCU 4 connected to the physical quantity sensor 1 to perform a variety of calculation processes and control processes.

The sensor element 2 is substantially the same in configuration as that in the first embodiment, and the description thereof will be omitted.

The sensor element control circuit 3 is configured including the analog front-end (AFE) 10, the digital arithmetic circuit 20, the memory 30, the interface circuit (I/F circuit) 40, the temperature detection element 50, the updating circuit 60, the update determination circuit 70, the rest determination circuit 80, the usage determination circuit 90, the reference voltage generation circuit 100, and the oscillation circuit 110, and can also be, for example, a single-chip integrated circuit (IC). It should be noted that the sensor element control circuit 3 can be provided with a configuration obtained by omitting or modifying some of these constituents, or adding other constituents.

The reference voltage generation circuit 100 is substantially the same in configuration as that in the first embodiment, and therefore the description thereof will be omitted. Further, the analog front-end (AFE) 10 is substantially the same in configuration as that in the first embodiment, and therefore the illustration (see FIG. 2) and the description thereof will be omitted. The temperature detection element 50 and the oscillation circuit 110 are the same in configuration as those in the first embodiment, and therefore the description thereof will be omitted. The digital arithmetic circuit 20 is substantially the same in configuration as that in the first embodiment, and therefore the illustration (see FIG. 3) and the description thereof will be omitted. The memory 30 is substantially the same in configuration as that in the first embodiment, and therefore the description thereof will be omitted.

The interface circuit 40 is a circuit for communicating with an external device (e.g., MCU 4). Similarly to the first embodiment, in the communication via the interface circuit 40, for example, the external device functions as a master, and the physical quantity sensor 1 (the sensor element control circuit 3) functions as a slave. Further, the external device is capable of writing data at a predetermined address of the register 31 and reading out data from a predetermined address of the register 31 via the interface circuit 40. As described above, the physical quantity sensor 1 (the sensor element control circuit 3) is configured so as to be able to output the physical quantity data VDO in response to a request from the external device. It should be noted that the interface circuit 40 is configured as, for example, the SPI interface circuit or the I2C interface circuit.

Further, it is also possible to input a signal representing an operating state of an apparatus (e.g., an electronic apparatus or a vehicle) constituted by the physical quantity sensor 1 (the sensor element control circuit 3) and the external device to the interface circuit 40. In the case in which, for example, the apparatus is an electronic apparatus such as a cellular phone (a smartphone), the signal representing the operating state of the apparatus includes a signal representing the operating state such as whether or not the electronic apparatus such as a cellular phone (a smartphone) is on charging, whether or not a camera is in use, or whether or not a game is in use. Further, in the case in which, for example, the external device is a vehicle such as a car, there is included the signal representing the operating state such as whether or not the engine has just been started, or whether or not an acceleration operation is in operation. Thus, the physical quantity sensor 1 (the sensor element control circuit 3) determines a prediction of the operation, whether or not the physical quantity sensor 1 is in use, and so on based on the operation information of the apparatus (e.g., the electronic apparatus and the vehicle) used.

It should be noted that the interface circuit 40 outputs the signal, which represents the operating state of the apparatus, and is input from the external device, to the update determination circuit 70 as the first operation information signal Sact1, and to the rest determination circuit 80 as the second operation information signal Sact2, and to the usage determination circuit 90 as the usage information signal Suse. It should be noted that the first operation information signal Sact1, the second operation information signal Sact2, and the usage information signal Suse can be signals different in type from each other, or can also be signals the same in type as each other. Here, the first operation information signal Sact1, the second operation information signal Sact2, and the usage information signal Suse each can be a signal representing the operating state of the apparatus, or can also be signals instructing the processes (control) respectively performed by the update determination circuit 70, the rest determination circuit 80, and the usage determination circuit 90 in accordance with the operating state of the apparatus.

To the usage determination circuit 90, the usage information signal Suse, which is one of the signals representing the operation state of the external apparatus, is input from the interface circuit 40. The usage determination circuit 90 determines whether or not the sensor element 2 is used based on the usage information signal Suse. In the case in which, for example, the apparatus in which the physical quantity sensor 1 is used is a digital camera (the electronic apparatus), and the usage information signal Suse is a signal representing the fact that shooting is in process, there is a possibility that the sensor element 2 is used for an image stabilization function or the like. Therefore, the usage determination circuit 90 determines that the sensor element 2 is in use. Further, in the case in which the apparatus in which the physical quantity sensor 1 is used is a digital camera (the electronic apparatus), and the usage information signal Suse is a signal representing the fact that charging is in process, it is conceivable that the digital camera (the electronic apparatus) is not in use. Therefore, the usage determination circuit 90 determines that the sensor element 2 is not in use.

Then, in the case in which the usage determination circuit 90 has determined that the sensor element 2 is not in use based on the usage information signal Suse, the sensor element control circuit 3 makes the transition from the operating mode in which the sensor element 2 is driven to the sleep mode low in power consumption.

The update determination circuit 70 determines the necessity of the update of the temperature compensation information stored in the memory 30 based on the temperature data VTref input from the digital arithmetic circuit 20, the update history signal Vhis input from the memory 30, and the first operation information signal Sact1 input from the interface circuit 40, and then outputs the update determination signal Vudj to the updating circuit 60.

In detail, the update determination circuit 70 makes the determination on whether or not the update of the temperature compensation information is necessary (effective) based on the first operation information signal Sact1 input from the interface circuit 40 and the update history information. For example, in the case in which the apparatus in which the physical quantity sensor 1 is used is the digital camera (the electronic apparatus), and the first operation information signal Sact1 is the signal representing charging of the digital camera (the electronic apparatus), it is conceivable that the temperature of the digital camera (the electronic apparatus) rises due to the heat generation during the charge. Therefore, it is conceivable that by performing the update of the temperature compensation information, it is possible to obtain the temperature compensation information in a broad temperature range. Thus, the update determination circuit 70 determines that it is necessary (effective) to update the temperature compensation information.

Further, for example, in the case in which the apparatus in which the physical quantity sensor 1 is used is the digital camera (the electronic apparatus), and the first operation information signal Sact1 is the signal representing low remaining battery level of the digital camera (the electronic apparatus), it is concerned that the battery drain is accelerated due to the update of the temperature compensation information. Therefore, the update determination circuit 70 determines that the update of the temperature compensation information is unnecessary (ineffective).

Then, in the case in which the update determination circuit 70 has determined that it is necessary (effective) to update the temperature compensation information, the update determination circuit 70 determines the necessity of the update of the temperature compensation information based on the temperature data VTref and the update history signal Vhis similarly to the physical quantity sensor 1 according to the first embodiment.

In the case in which the update determination circuit has determined that the update of the temperature compensation information is unnecessary, the update determination circuit 70 makes the update determination signal Vudj to be output to the updating circuit 60 inactive. Further, in the case in which the update determination circuit 70 has determined that the update of the temperature compensation information is necessary, the update determination circuit 70 activates the update determination signal Vudj to be output to the updating circuit 60.

As described above, in the physical quantity sensor 1 according to the second embodiment, the update determination circuit 70 determines whether or not the update of the temperature compensation information is necessary (effective) in advance based on the first operation information signal Sact1. Thus, it becomes possible to further reduce the execution of the unnecessary update of the temperature compensation information. Therefore, it becomes possible to further reduce the power consumption in the update of the temperature compensation information.

Further, it is also possible for the update determination circuit 70 to predict an environmental change such as rise in temperature based on the first operation information signal Sact1 and the update history information of the temperature compensation information to make the determination on whether or not the update of the temperature compensation information is necessary (effective).

In detail, it is also possible for the update determination circuit 70 to predict a variation (temporal variation) over time of the temperature data VTref based on the first operation information signal Sact1 and the update history signal Vhis to make the determination on whether or not the update of the temperature compensation information is necessary (effective).

For example, in the case in which the apparatus in which the physical quantity sensor 1 is used is the digital camera (the electronic apparatus), and the first operation information signal Sact1 is the signal representing the charge, it is conceivable that the temperature of the digital camera (the electronic apparatus) rises due to the heat generation during the charge. In this case, the update determination circuit 70 predicts the rise in temperature due to the heat generation during the charge of the digital camera (the electronic apparatus) from the update history signal Vhis and the current temperature data VTref. Then, the update determination circuit 70 makes the determination on whether or not the update of the temperature compensation information is necessary (effective) based on the prediction result of the rise in temperature. It should be noted that in the case of performing the prediction of the rise in temperature, the update history information can also include history data or the like representing the previous rise in temperature in the case in which the first operation information signal Sact1 corresponds to the charge.

Then, in the case in which the update determination circuit 70 has determined that the update of the temperature compensation information is necessary (effective), the update determination circuit 70 determines the necessity of the update of the temperature compensation information based on the temperature data VTref and the update history signal Vhis similarly to the physical quantity sensor 1 according to the first embodiment.

In the case in which the update determination circuit has determined that the update of the temperature compensation information is unnecessary, the update determination circuit 70 makes the update determination signal Vudj to be output to the updating circuit 60 inactive. Further, in the case in which the update determination circuit 70 has determined that the update of the temperature compensation information is necessary, the update determination circuit 70 activates the update determination signal Vudj to be output to the updating circuit 60.

As described above, by the update determination circuit 70 predicting an environmental change such as rise in temperature based on the first operation information signal Sact1 and the update history information of the temperature compensation information to make the determination on whether or not the update of the temperature compensation information is necessary (effective), it becomes possible to further reduce the unnecessary update of the temperature compensation information. Therefore, it becomes possible to further reduce the power consumption in the update of the temperature compensation information.

It should be noted that the update determination circuit 70 can be provided with a signal processing circuit not shown for performing reception, identification, determination, and processing of the first operation information signal Sact1.

The rest determination circuit 80 determines whether or not the sensor element 2 is at rest based on the second operation information signal Sact2, and then outputs the rest determination signal Vstj to the updating circuit 60. For example, in the case in which the apparatus in which the physical quantity sensor 1 is used is the digital camera (the electronic apparatus), and the second operation information signal Sact2 is the signal representing the charge, it is conceivable that the apparatus (the digital camera) in which the physical quantity sensor 1 is used is in a laid state. In other words, it is conceivable that the physical quantity sensor 1 (the sensor element 2) incorporated in the digital camera (the electronic apparatus) is also at rest. Therefore, the rest determination circuit 80 determines that the sensor element 2 is at rest based on the second operation information signal Sact2, and then activates the rest determination signal Vstj to be output to the updating circuit 60.

Further, for example, in the case in which the apparatus in which the physical quantity sensor 1 is used is the digital camera (the electronic apparatus), and the second operation information signal Sact2 is the signal representing browsing of the images obtained by the digital camera (the electronic apparatus), it is conceivable that the apparatus (the digital camera) in which the physical quantity sensor 1 is used is hand-carried. In other words, it is conceivable that the physical quantity sensor 1 (the sensor element 2) incorporated in the digital camera (the electronic apparatus) is also in motion. Therefore, the rest determination circuit 80 determines that the sensor element 2 is not at rest based on the second operation information signal Sact2, and then makes the rest determination signal Vstj to be output to the updating circuit 60 inactive.

As described above, the rest determination circuit 80 makes the determination on whether or not the sensor element 2 is at rest based on the second operation information signal Sact2. Therefore, it becomes possible for the sensor element control circuit 3 to make the determination on whether or not the sensor element 2 is at rest without depending on the signal detected from the sensor element 2. Therefore, it becomes possible for the rest determination circuit 80 to reduce the influence of the noise and so on to thereby improve the accuracy of the determination on whether or not the sensor element 2 is at rest.

It should be noted that the rest determination circuit 80 can also be provided with a signal processing circuit not shown for performing reception, identification, determination, and processing of the second operation information signal Sact2.

In the physical quantity sensor 1 according to the second embodiment, the apparatus (e.g., the electronic apparatus and the vehicle) constituted by the physical quantity sensor 1 (the sensor element control circuit 3) and the external device is described citing the digital camera as an example. However, the physical quantity sensor 1 (the sensor element control circuit 3) can also be used in the electronic apparatus such as a cellular phone (smartphone) or a personal computer (a tablet computer), and can also be used in the vehicle such as a car.

The updating circuit 60 makes the determination on whether or not the temperature compensation information stored in the memory 30 is to be updated based on the update determination signal Vudj and the rest determination signal Vstj similarly to the physical quantity sensor 1 according to the first embodiment. Then, in the case in which the updating circuit 60 has determined that the temperature compensation information is to be updated, the updating circuit 60 stores the update signal SUD based on the temperature data VTref and the sensor element detection data VTref input to the updating circuit 60 to the memory 30.

Method of Updating Temperature Compensation Information

Figure 7:
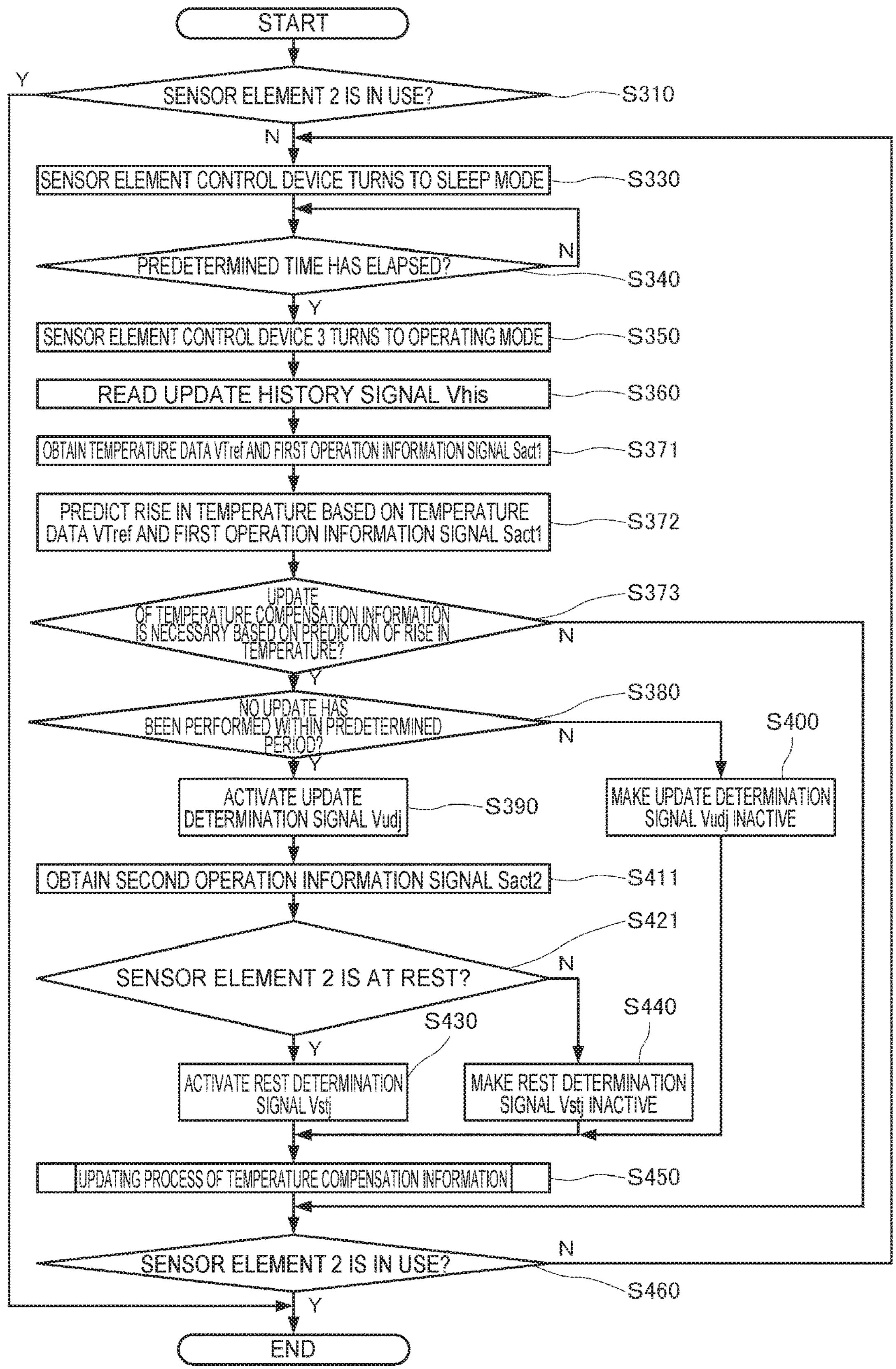
FIG. 7 is a flowchart showing an example of a method of determining necessity of an update of temperature compensation information of a physical quantity sensor according to the second embodiment, and a method of updating the temperature compensation information.

Here, a method of determining the necessity of the update of the temperature compensation information of the physical quantity sensor 1 according to the second embodiment, and a method of updating the temperature compensation information will be described using FIG. 7. FIG. 7 is a flowchart showing an example of the method of determining the necessity of the update of the temperature compensation information of the physical quantity sensor 1 according to the second embodiment, and the method of updating the temperature compensation information.

In the physical quantity sensor 1 according to the second embodiment, firstly, the usage determination circuit 90 performs (step S310) the determination on whether or not the sensor element 2 is in use similarly to the first embodiment. Then, in the usage determination circuit 90, in the case in which it has been determined that the sensor element 2 is in use (Y in the step S310), the update of the temperature compensation information is not performed. In contrast, in the case in which it has been determined that the sensor element 2 is not in use (N in the step S310) in the usage determination circuit 90, the physical quantity sensor 1 (the sensor element control circuit 3) makes the transition to the sleep mode (step S330). Then, after the transition to the sleep mode, the physical quantity sensor 1 (the sensor element control circuit 3) waits (step S340) for elapse of predetermined time. When the predetermined time elapses (Y in the step S340) after the transition of the physical quantity sensor 1 (the sensor element control circuit 3) to the sleep mode, the physical quantity sensor 1 (the sensor element control circuit 3) makes the transition (step S350) to the operating mode. Here, the predetermined time can be set in a range from several seconds to several hours. Further, the predetermined time can also be set based on the usage information signal Suse input to the usage determination circuit 90 via the interface circuit 40.

After the transition to the operating mode, the update determination circuit 70 reads (step S360) the update history signal Vhis. Further, the update determination circuit 70 obtains (step S371) the temperature data VTref and the first operation information signal Sact1.

Then, the update determination circuit 70 predicts (step S372) the variation (rise in temperature) over time of the temperature data VTref based on the update history signal Vhis, the temperature data VTref, and the first operation information signal Sact1 obtained.

The update determination circuit 70 makes the determination on whether or not the update of the temperature compensation information is necessary (effective) (step S373) based on the prediction result of the rise in temperature. For example, the update determination circuit 70 makes the determination on whether or not the temperature (the temperature data VTref) at which the temperature compensation information should be updated exists in the temperature range in which the variation (rise in temperature) over time of the temperature data VTref is predicted. Then, the update determination circuit 70 determines whether or not the update of the temperature compensation information is necessary (effective).

In the case in which the update determination circuit has determined that the update of the temperature compensation information is unnecessary (ineffective) (N in the step S373), the update of the temperature compensation information is not performed, and then the transition to the determination (step S460) on whether or not the sensor element 2 is in use is made.

In contrast, in the case in which the update determination circuit 70 has determined that the update of the temperature compensation information is necessary (effective) (Y in the step S373), the update determination circuit 70 determines the necessity of the update of the temperature compensation information based on the update history signal Vhis and the temperature data VTref. The update determination circuit 70 figures out when the offset level corresponding to the value (the current temperature) of the temperature data VTref has been updated based on the time information included in the update history signal Vhis and the temperature data VTref. Then, the update determination circuit 70 makes (step S380)

the determination on whether or not the update of the temperature compensation information has been performed within a predetermined period from the present.

In the case in which the update determination circuit has determined that the update of the temperature compensation information has not been performed within the predetermined period from the present (Y in the step S380), the update determination circuit 70 activates (step S390) the update determination signal Vudj. In contrast, in the case in which the update determination circuit 70 has determined that the update of the temperature compensation information has been performed within the predetermined period from the present (N in the step S380), the update determination circuit 70 makes (step S400) the update determination signal Vudj inactive.

After the update determination signal Vudj is activated, the rest determination circuit 80 obtains (step S411) the second operation information signal Sact2. Then, the rest determination circuit 80 makes the determination on whether or not the sensor element 2 is at rest based on the second operation information signal Sact2 input to the rest determination circuit 80 (step S421).

In the case in which the rest determination circuit 80 has determined that the sensor element 2 is at rest (Y in the step S421), the rest determination circuit 80 activates (step S430) the rest determination signal Vstj. In contrast, in the case in which the rest determination circuit 80 has determined that the sensor element 2 is not at rest (N in the step S421), the rest determination circuit 80 makes (step S440) the rest determination signal Vstj inactive.

Then, the updating circuit 60 performs (step S450) the updating process of the temperature compensation information. It should be noted that since the updating process of the temperature compensation information by the updating circuit 60 is the same as in the physical quantity sensor 1 according to the first embodiment, the illustration (FIG. 5) and the description thereof will be omitted.

After the updating process of the temperature compensation information is completed, the usage determination circuit 90 makes (step S460) the determination on whether or not the sensor element 2 is in use once again. In the case in which the usage determination circuit 90 has determined that the sensor element 2 is in use, the update of the temperature compensation information is terminated. In contrast, in the case in which the usage determination circuit 90 has determined that the sensor element 2 is not in use, the transition to the sleep mode is made (step S330) once again.

Functions and Advantages

As described above, according to the physical quantity sensor 1 related to the second embodiment, in addition to the functions and the advantages obtained by the physical quantity sensor according to the first embodiment, the update determination circuit 70 predicts the temporal change of the temperature data VTref based on the first operation information signal Sact1 representing the operation information of the apparatus in which the physical quantity sensor 1 is used. Thus, it becomes possible to predict the necessity of the update of the temperature compensation information over time. In other words, it is possible for the update determination circuit 70 to determine the necessity of the update of the temperature compensation information including the necessity of the update of the temperature compensation information over time. Therefore, it becomes possible to further prevent the execution of the unnecessary update of the temperature compensation information. Therefore, it becomes possible to further reduce the power consumption in the update of the temperature compensation information.

Further, according to the physical quantity sensor 1 of the second embodiment, it becomes possible for the rest determination circuit 80 to determine the rest based on the second operation information representing the operation information of the apparatus in which the physical quantity sensor 1 is used. Therefore, it becomes possible to reduce false determination in the rest determination due to the noise or the like, and the accuracy of the determination on whether or not the sensor element 2 is at rest is further enhanced. Therefore, it becomes possible to more accurately obtain the correction value in the case in which the sensor element 2 is at rest.

1.3 Third Embodiment

The physical quantity sensor 1 according to a third embodiment will hereinafter be described. In the physical quantity sensor 1 according to the third embodiment, the description will be presented with a focus on the contents in which the third embodiment is different from the first embodiment and the second embodiment, and the description redundant to the first embodiment and the second embodiment will be omitted. It should be noted that in the physical quantity sensor 1 according to the third embodiment, the description will be presented with the constituents substantially the same as those of the physical quantity sensor 1 according to the first embodiment and the second embodiment denoted by the same reference symbols.

The physical quantity sensor 1 according to the third embodiment is different from the physical quantity sensor 1 according to the first and second embodiments in the point that the physical quantity sensor is configured including a plurality of sensor elements 2. It should be noted that although in the third embodiment, the update determination circuit 70 determines the necessity of the update of the temperature compensation information based on the temperature data VTref and the update history signal Vhis as described in the first embodiment, it is also possible to determine the necessity of the update of the temperature compensation information based on the first operation information signal Sact1 in addition to the temperature data VTref and the update history signal Vhis as described in the second embodiment.

Configuration of Physical Quantity Detection Device

Figure 8:
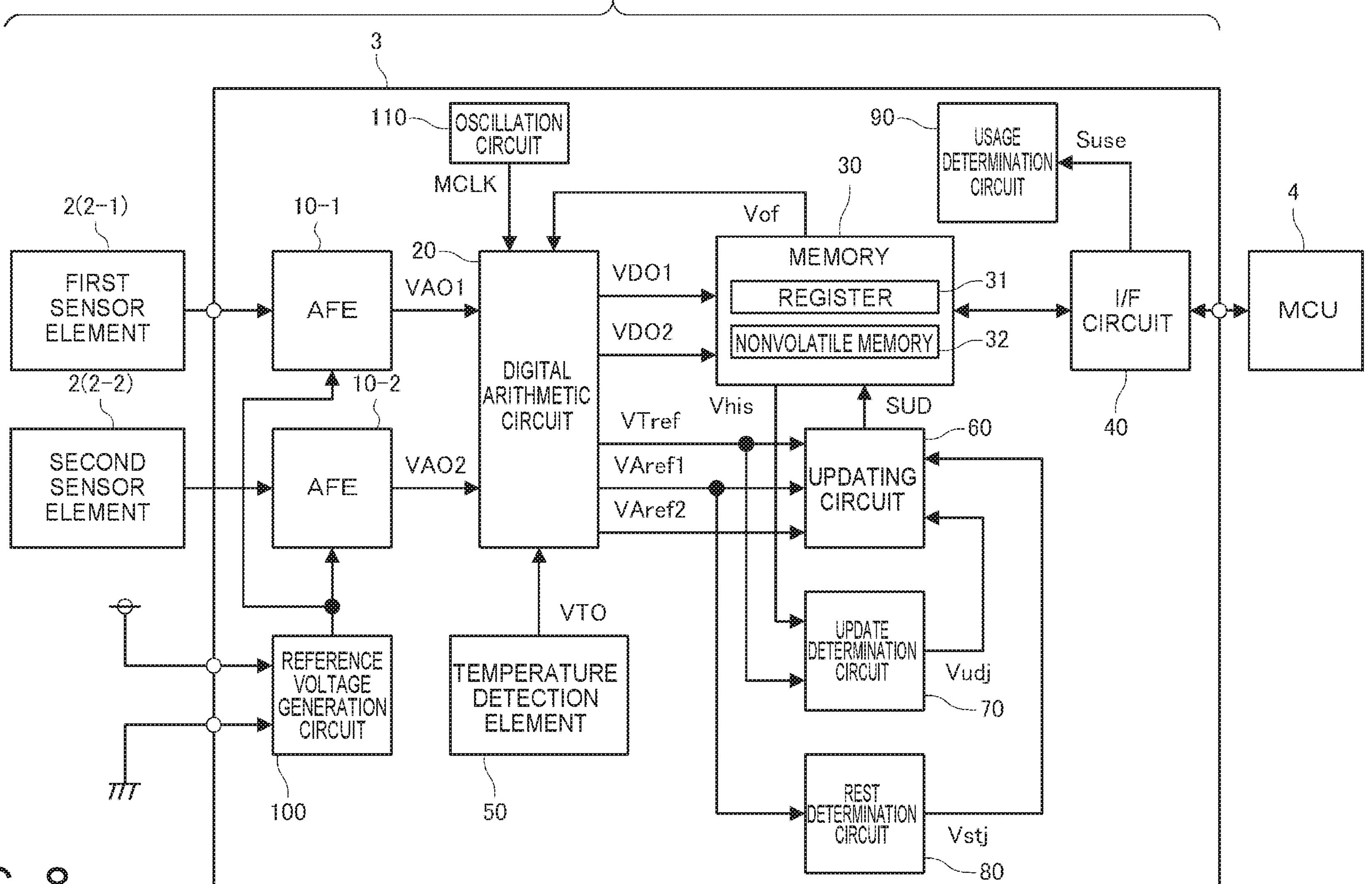
FIG. 8 is a functional block diagram of a physical quantity sensor according to a third embodiment of the invention.

The configuration of the physical quantity sensor 1 according to the third embodiment will be described using FIG. 8. FIG. 8 is a functional block diagram of the physical quantity sensor according to the third embodiment. The physical quantity sensor 1 according to the third embodiment is configured including two sensor elements 2 (2-1, 2-2) for outputting an analog signal related to a physical quantity, and the sensor element control circuit 3 to which the two sensor elements 2 (2-1, 2-2) can be connected. It is also possible for the physical quantity sensor 1 to be configured further including an MCU 4 connected to the physical quantity sensor 1 to perform a variety of calculation processes and control processes.

Each of the two sensor elements 2 (2-1, 2-2) is an element for detecting the physical quantity (in particular, inertial force such as angular velocity or acceleration) to convert the physical quantity into an electric signal (a detected signal), and outputting the electric signal. For example, each of the two sensor elements 2 (2-1, 2-2) can also be a vibrational sensor element including a piezoelectric type vibrator element or a capacitance detection type vibrator element. The two sensor elements 2 (2-1, 2-2) each detect the physical quantity (in particular, the inertial force such as angular velocity or acceleration), and the electric signal obtained by converting the physical quantity has a temperature characteristic to cause a variation of the voltage level corresponding to the ambient temperature.

Further, the two sensor elements 2 (2-1, 2-2) can detect the physical quantities of the same kind, or can also detect the physical quantities different in kind from each other. For example, in the case in which the sensor element 2-1 is the sensor element 2 for detecting the acceleration (the physical quantity), and the sensor element 2-2 is the sensor element 2 for detecting the angular velocity (the physical quantity), the physical sensor 1 functions as a combo sensor. It should be noted that in the physical quantity sensor 1 according to the third embodiment, the sensor element 2-2 (an example of a "second inertial sensor element") is the sensor element 2 higher in power consumption than the sensor element 2-1 (an example of a "first inertial sensor element").

In the physical quantity sensor 1 according to the third embodiment, each of the sensor elements 2-1, 2-2 has two detecting electrodes (not shown), namely a positive electrode and a negative electrode, and outputs a pair of differential detected signals from these detecting electrodes. Further, it is also possible for each of the sensor elements 2-1, 2-2 to output a single-ended detected signal. It should be noted that although in the physical quantity sensor 1 according to the third embodiment, the two sensor elements 2-1, 2-2 are connected to the sensor element control circuit 3, it is also possible to connect three or more sensor elements 2.

The sensor element control circuit 3 can be connected to each of the two sensor elements 2-1, 2-2, and outputs drive signals for driving the two sensor elements 2-1, 2-2. Further, the sensor element control circuit 3 performs amplification and correction on each of the electric signals output by the two sensor elements 2-1, 2-2, and outputs the result as physical quantity signals corresponding to the magnitudes of the physical quantities (inertial force) detected by the respective two sensor elements 2-1, 2-2.

The sensor element control circuit 3 is configured including two analog front-ends (AFE) 10-1, 10-2, the digital arithmetic circuit 20, the memory 30, the interface circuit (I/F circuit) 40, the temperature detection element 50, the updating circuit 60, the update determination circuit 70, the rest determination circuit 80, the usage determination circuit 90, the reference voltage generation circuit 100, and the oscillation circuit 110, and can also be, for example, a single-chip integrated circuit (IC). It should be noted that the sensor element control circuit 3 can be provided with a configuration obtained by omitting or modifying some of these constituents, or adding other constituents.

The reference voltage generation circuit 100 is substantially the same in configuration as that in the first embodiment, and therefore the description thereof will be omitted. The temperature detection element 50 and the oscillation circuit 110 are the same in configuration as those in the first embodiment, and therefore the description thereof will be omitted. The interface circuit (I/F circuit) 40 and the usage determination circuit 90 are the same in configuration as those in the first embodiment, and therefore the description thereof will be omitted.

The detected signal output by the sensor element 2-1 is input to the analog front-end (AFE) 10-1, and the analog front-end (AFE) 10-1 outputs a physical quantity signal VAO1, which is an analog signal with a voltage corresponding to the physical quantity (the inertial force) detected by the sensor element 2-1, to the digital arithmetic circuit 20.

The detected signal output by the sensor element 2-2 is input to the analog front-end (AFE) 10-2, and the analog front-end (AFE) 10-2 outputs a physical quantity signal VAO2, which is an analog signal with a voltage corresponding to the physical quantity (the inertial force) detected by the sensor element 2-2, to the digital arithmetic circuit 20.

It should be noted that each of the two analog front-ends 10-1, 10-2 is substantially the same in configuration as the analog front-end 10 shown in the physical quantity sensor 1 according to the first embodiment. Therefore, the illustration (see FIG. 2) and the detailed description thereof will be omitted. It should be noted that each of the analog front-ends 10-1, 10-2 can be provided with a configuration obtained by omitting or modifying some of the constituents shown in FIG. 2, or adding other constituents.

The digital arithmetic circuit 20 converts each of the physical quantity signals VAO1, VAO2 output respectively from the two analog front-ends 10-1, 10-2 into a digital signal, then corrects the digital signal with the temperature signal VTO output from the temperature detection element 50, and then outputs the result to the memory 30 as physical quantity data VDO1, VDO2 of the digital signals. Further, the digital arithmetic circuit 20 outputs temperature data VTref to the updating circuit 60 and the update determination circuit 70. Further, the digital arithmetic circuit 20 outputs sensor element detection data VTref1 to the updating circuit 60 and the rest determination circuit 80. Further, the digital arithmetic circuit 20 outputs sensor element detection data VTref2 to the updating circuit 60.

Figure 9:
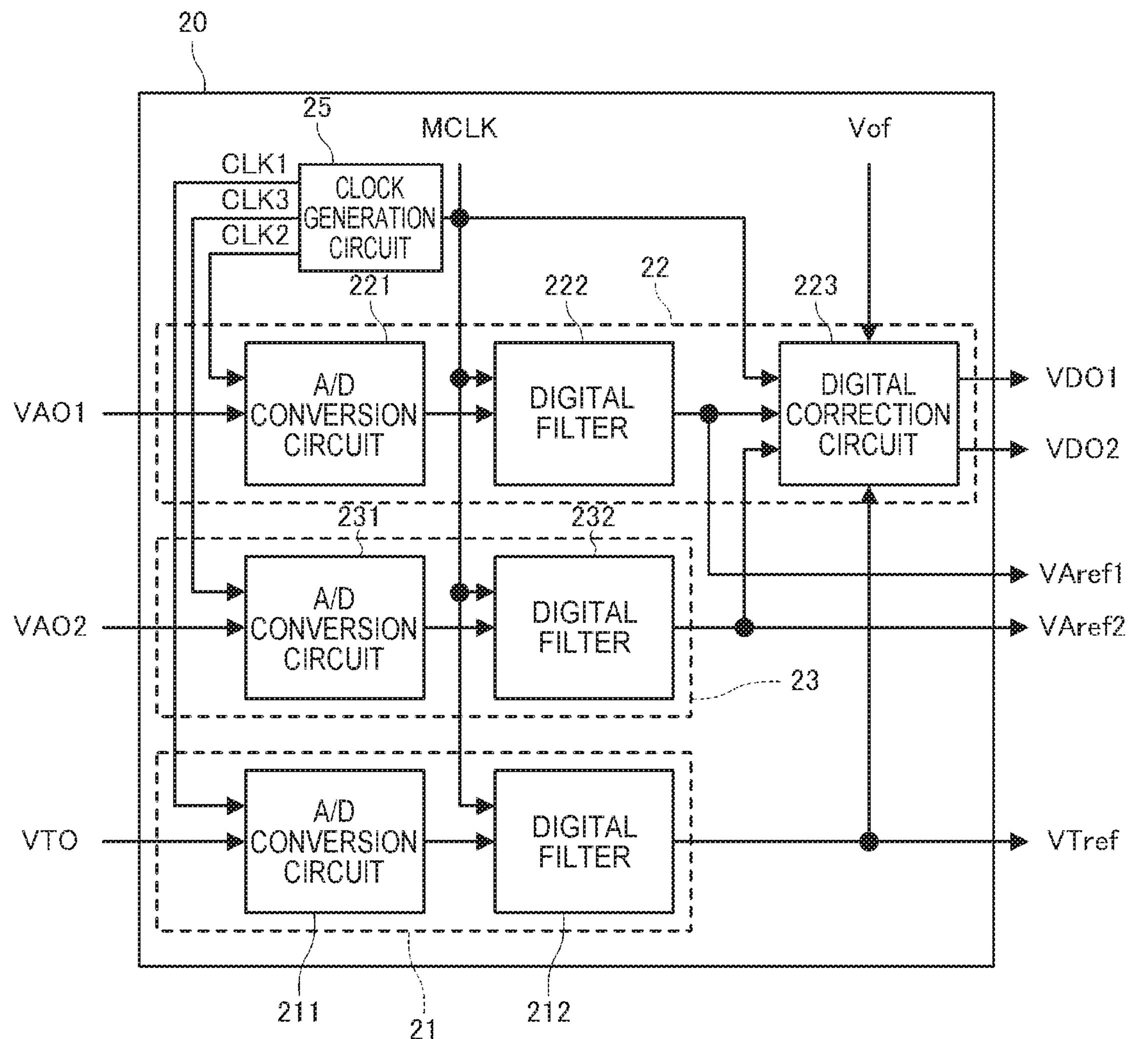
FIG. 9 is a diagram showing a configuration of a digital arithmetic circuit of the physical quantity sensor according to the third embodiment.

FIG. 9 is a diagram showing a configuration of the digital arithmetic circuit 20. The digital arithmetic circuit 20 includes the first physical quantity arithmetic circuit 21, the second physical quantity arithmetic circuit 22, a third physical quantity arithmetic circuit 23, and the clock generation circuit 25.

The clock generation circuit 25 generates and then outputs the sampling clock signal CLK1 for the A/D conversion circuit 211 included in the first physical quantity arithmetic circuit 21, the sampling clock signal CLK2 for the A/D conversion circuit 221 included in the second physical quantity arithmetic circuit 22, and a sampling clock signal CLK3 for an A/D conversion circuit 231 included in the third physical quantity arithmetic circuit 23 based on the master-clock signal MCLK (the output signal of the oscillation circuit 110).

The first physical quantity arithmetic circuit 21 includes the A/D conversion circuit 211 and the digital filter 212. The temperature signal VTO is input to the first physical quantity arithmetic circuit 21, and the first physical quantity arithmetic circuit 21 outputs the temperature data VTref.

The A/D conversion circuit 211 converts the temperature signal VTO into the digital signal in sync with the sampling clock signal CLK1.

The digital filter 212 performs the filtering process of the signal (the digital signal of the temperature signal VTO) output from the A/D conversion circuit 211. Then, the signal (the signal based on the digital signal of the temperature signal VTO) on which the filtering process has been performed in the digital filter 212 is output from the digital arithmetic circuit 20 as the temperature data VTref. Further, the signal (the signal based on the digital signal of the temperature signal VTO) on which the filtering process has been performed in the digital filter 212 is input to the digital correction circuit 223 included in the second physical quantity arithmetic circuit 22.

The third physical quantity arithmetic circuit 23 includes the A/D conversion circuit 231 and a digital filter 232. The physical quantity signal VAO2 is input to the third physical quantity arithmetic circuit 23, and the third physical quantity arithmetic circuit 23 outputs the sensor element detection data VTref2.

The A/D conversion circuit 231 converts the temperature signal VTO into a digital signal in sync with the sampling clock signal CLK2.

The digital filter 232 performs a filtering process of the signal (the digital signal of the physical quantity signal VAO2) output from the A/D conversion circuit 231. Then, the signal (the signal based on the digital signal of the physical quantity signal VAO2) on which the filtering process has been performed in the digital filter 232 is output from the digital arithmetic circuit 20 as the sensor element detection data VTref2. Further, the signal (the signal based on the digital signal of the physical quantity signal VAO2) on which the filtering process has been performed in the digital filter 212 is input to the digital correction circuit 223 included in the second physical quantity arithmetic circuit 22.

The second physical quantity arithmetic circuit 22 includes the A/D conversion circuit 221, the digital filter 222, and the digital correction circuit 223. The physical quantity signal VAO1 is input to the second physical quantity arithmetic circuit 22, and the second physical quantity arithmetic circuit 22 outputs the physical quantity data VDO1, VDO2 and the sensor element detection data VTref1.

The A/D conversion circuit 221 converts the physical quantity signal VAO1 into a digital signal in sync with the sampling clock signal CLK2.

The digital filter 222 performs the filtering process of the signal (the digital signal of the physical quantity signal VAO1) output from the A/D conversion circuit 221. Then, the signal (the signal based on the digital signal of the physical quantity signal VAO1) on which the filtering process has been performed in the digital filter 222 is output from the digital arithmetic circuit 20 as the sensor element detection data VTref1. Further, the signal (the signal based on the digital signal of the physical quantity signal VAO1) on which the filtering process has been performed in the digital filter 222 is input to the digital correction circuit 223.

To the digital correction circuit 223, there are input a temperature correction signal Vof including the temperature compensation information output from the memory 30 (see FIG. 1) described later, the signal (the signal based on the digital signal of the physical quantity signal VAO1) output from the digital filter 222, the signal (the signal based on the digital signal of the physical quantity signal VAO2) output from the digital filter 232, and the signal (the signal based on the digital signal of the temperature signal VTO) output from the digital filter 212. Then, the digital correction circuit 223 corrects the signal (the signal based on the digital signal of the physical quantity signal VAO1) output from the digital filter 222 based on the temperature correction signal Vof and the signal (the signal based on the digital signal of the temperature signal VTO) output from the digital filter 212, and then outputs the signal thus corrected as the physical quantity data VDO1 of the digital signal. Further, the digital correction circuit 223 corrects the signal (the signal based on the digital signal of the physical quantity signal VAO2) output from the digital filter 232 based on the temperature correction signal Vof and the signal (the signal based on the digital signal of the temperature signal VTO) output from the digital filter 212, and then outputs the signal thus corrected as the physical quantity data VDO2 of the digital signal.

Going back to FIG. 8, the memory 30 has the register 31 and the nonvolatile memory 32. In the register 31, there is set the information of an address and data used for communication with the external device via the interface circuit 40. Further, in the register 31, there is stored the physical quantity data VDO1, VDO2 output from the digital arithmetic circuit 20.

Similarly to the physical quantity sensor 1 according to the first embodiment, in the nonvolatile memory 32, there are stored a variety of types of trimming data (e.g., adjustment data and a correction data) such as temperature compensation information and update history information of the temperature compensation information for correcting the output signal of the digital filter 222 with the signal based on the digital signal of the temperature signal VTO, and a variety of types of information for establishing the communication with external equipment via the interface circuit 40.

Similarly to the case of the physical quantity sensor 1 according to the first embodiment, the memory 30 outputs the temperature compensation information to the digital correction circuit 223 included in the digital arithmetic circuit 20 as the temperature correction signal Vof. Further, the memory 30 outputs the update history information of the temperature compensation information to the update determination circuit 70 as an update history signal Vhis.

Similarly to the case of the first embodiment, the update determination circuit 70 determines the necessity of the update of the temperature compensation information stored in the memory 30 based on the temperature data VTref input from the digital arithmetic circuit 20, and the update history signal Vhis input from the memory 30, and then outputs an update determination signal Vudj to the updating circuit 60.

The rest determination circuit 80 determines whether or not the two sensor elements 2-1, 2-2 are at rest based on the sensor element detection data VTref1 input from the digital arithmetic circuit 20, and then outputs the rest determination signal Vstj to the updating circuit 60.

Here, the sensor element detection data VTref1 is the signal obtained by converting the detected signal output by the sensor element 2-1 into the physical quantity signal VAO1 in the analog front-end 10-1, further converting the physical quantity signal VAO1 into the digital signal, and then outputting the digital signal via the digital filter 222. In other words, the sensor element detection data VTref1 is a signal based on the output signal of the sensor element 2-1. Specifically, in the physical quantity sensor 1 according to the third embodiment, the rest determination circuit 80 makes the determination on whether or not the sensor elements 2-1, 2-2 are at rest based on the signal based on the output signal of the sensor element 2-1.

As described above, the rest determination circuit 80 makes the determination on whether or not both of the sensor elements 2-1, 2-2 are at rest with the signal based on the output signal of the sensor element 2-1, namely one of the sensor elements 2-1, 2-2. In other words, in the case in which the plurality of sensor elements 2 is connected to the sensor element control circuit 3, the rest determination circuit 80 makes the determination on whether or not the plurality of sensor elements 2 is at rest with the signal based on some of the output signals of the plurality of sensor elements 2. As described above, by making the determination on whether or not the plurality of sensor elements 2 is at rest with the signal based on some of the output signals of the plurality of sensor elements 2, it becomes possible to reduce the power consumption when determining whether or not the plurality of sensor elements 2 is at rest.

Further, since in the physical quantity sensor 1 according to the third embodiment, the power consumption of the sensor element 2-1 for making the determination on whether or not the sensor elements 2-1, 2-2 are at rest in the rest determination circuit 80 is lower than the power consumption of the sensor element 2-2. Therefore, it is possible for the rest determination circuit 80 to make the determination on whether or not both of the sensor elements 2-1, 2-2 are at rest with the signal based on the output signal of the sensor element 2-1 lower in power consumption. Therefore, according to the physical quantity sensor 1 of the third embodiment, it becomes possible to further reduce the power consumption when determining whether or not the sensor elements 2-1, 2-2 are at rest.

The updating circuit 60 makes the determination on whether or not the temperature compensation information stored in the memory 30 is to be updated based on the update determination signal Vudj and the rest determination signal Vstj similarly to the physical quantity sensor 1 according to the first embodiment. Then, in the case in which the updating circuit 60 has determined that the temperature compensation information is to be updated, the updating circuit 60 stores the update signal SUD based on the temperature data VTref and the sensor element detection data VTref1, VTref2 input to the updating circuit 60 to the memory 30.

It should be noted that regarding the temperature compensation information, in the case of the physical quantity sensor 1 provided with a plurality of sensor elements 2, the offset levels of the sensor element 2 corresponding to the respective values (temperature) of the temperature data VTref are stored in the memory 30 as the temperature compensation information with respect to each of the plurality of sensor elements 2.

Functions and Advantages

According to the physical quantity sensor 1 of the third embodiment, in addition to the functions and advantages of the physical quantity sensor 1 according to the first embodiment, it becomes possible for the rest determination circuit 80 to make the rest determination of the plurality of sensor elements 2 with the signal based on the output signal of the sensor element 2 lower in power consumption out of the plurality of sensor elements 2 in the sensor element control circuit 3 to which the plurality of sensor elements 2 is connected. Thus, it becomes possible to further reduce the power consumption when the rest determination circuit 80 makes the determination on whether or not the inertial sensor element is at rest. Therefore, it becomes possible to further reduce the power consumption in the update of the temperature compensation information.

2. Electronic Apparatus

Figure 10:
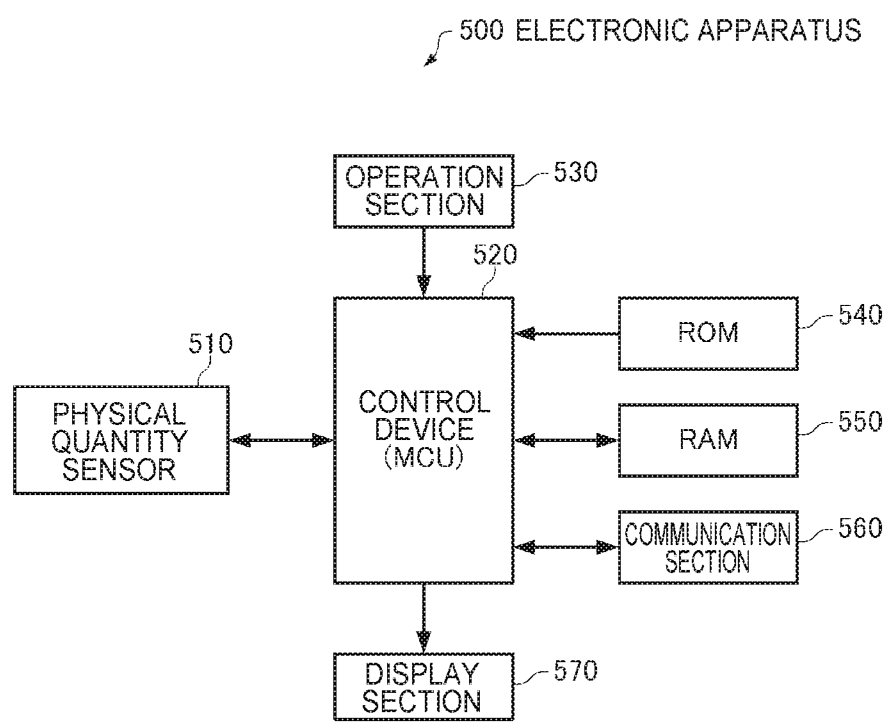
FIG. 10 is a functional block diagram showing an example of a configuration of an electronic apparatus.

FIG. 10 is a functional block diagram showing an example of a configuration of an electronic apparatus according to the present embodiment. As shown in FIG. 10, the electronic apparatus 500 according to the present embodiment is configured including a physical quantity sensor 510, a control device (MCU) 520, an operation section 530, a read only memory (ROM) 540, a random access memory (RAM) 550, a communication section 560, and a display section 570. It should be noted that the electronic apparatus according to the present embodiment can be provided with a configuration obtained by omitting or modifying some of the constituents (sections) shown in FIG. 10, or adding other constituents thereto.

The physical quantity sensor 510 detects the physical quantity, and outputs the detection result to the control device (MCU) 520. As the physical quantity sensor 510, it is possible to apply, for example, the physical quantity sensor 1 according to the present embodiment described above.

The control device (MCU) 520 transmits a communication signal to the physical quantity sensor 510, and performs a variety of arithmetic processing and control processing using the output signal of the physical quantity sensor 510 in accordance with the program stored in the ROM 540 and so on. Besides the above, the control device (MCU) 520 performs a variety of processes corresponding to the operation signal from the operation section 530, a process of controlling the communication section 560 for performing data communication with external devices, a process of transmitting a display signal for making the display section 570 display a variety of types of information, and so on.

Further, the control device (MCU) 520 outputs the operation information signal of the electronic apparatus 500 to the physical quantity sensor 510. The operation information signal can also be, for example, the information representing the fact that an operation of an operation key, a button switch, or the like is performed in the operation section 530 described later, or can also be a variety of types of information to be displayed on the display section 570.

The operation section 530 is an input device constituted by operation keys, button switches, and so on, and outputs the operation signal corresponding to the operation by the user to the control device (MCU) 520.

The ROM 540 stores the programs, data, and so on for the control device (MCU) 520 to perform the variety of types of arithmetic processing and control processing.

The RAM 550 is used as a working area of the control device (MCU) 520, and temporarily stores, for example, the programs and the data retrieved from the ROM 540, the data input from the operation section 530, and the calculation result obtained by the control device (MCU) 520 performing operations in accordance with the variety of types of programs.

The communication section 560 performs a variety of types of control for establishing the data communication between the control device (MCU) 520 and external equipment.

The display section 570 is a display device formed of a liquid crystal display (LCD) or the like, and displays a variety of types of information based on the display signal input from the control device (MCU) 520. The display section 570 can also be provided with a touch panel, which functions as the operation section 530.

By applying, for example, the physical quantity sensor 1 according to the present embodiment described above as the physical quantity sensor 510, it is possible to realize, for example, the electronic apparatus high in reliability.

As such an electronic apparatus 500, a variety of electronic apparatuses can be adopted, and there can be cited, for example, a personal computer (e.g., a mobile type personal computer, a laptop personal computer, and a tablet personal computer), a mobile terminal such as a smartphone or a cellular phone, a digital camera, an inkjet ejection device (e.g., an inkjet printer), a storage area network apparatus such as a router or a switch, a local area network apparatus, an apparatus for a mobile terminal base station, a television set, a video camera, a video cassette recorder, a car navigation system, a real-time clock device, a pager, a personal digital assistance (including one having a communication function), an electronic dictionary, an electronic calculator, an electronic game machine, a gaming controller, a word processor, a workstation, a picture phone, a security television monitor, an electronic binoculars, a POS terminal, a medical instrument (e.g., an electronic thermometer, a blood pressure monitor, a blood glucose monitor, an electrocardiograph, ultrasonic diagnostic equipment, and an electronic endoscope), a fish finder, a variety of measuring instruments, gauges (e.g., gauges for cars, aircrafts, and boats and ships), a flight simulator, a head-mount display, a motion tracer, a motion tracker, a motion controller, and a pedestrian dead reckoning (PDR) system.

Figure 11:
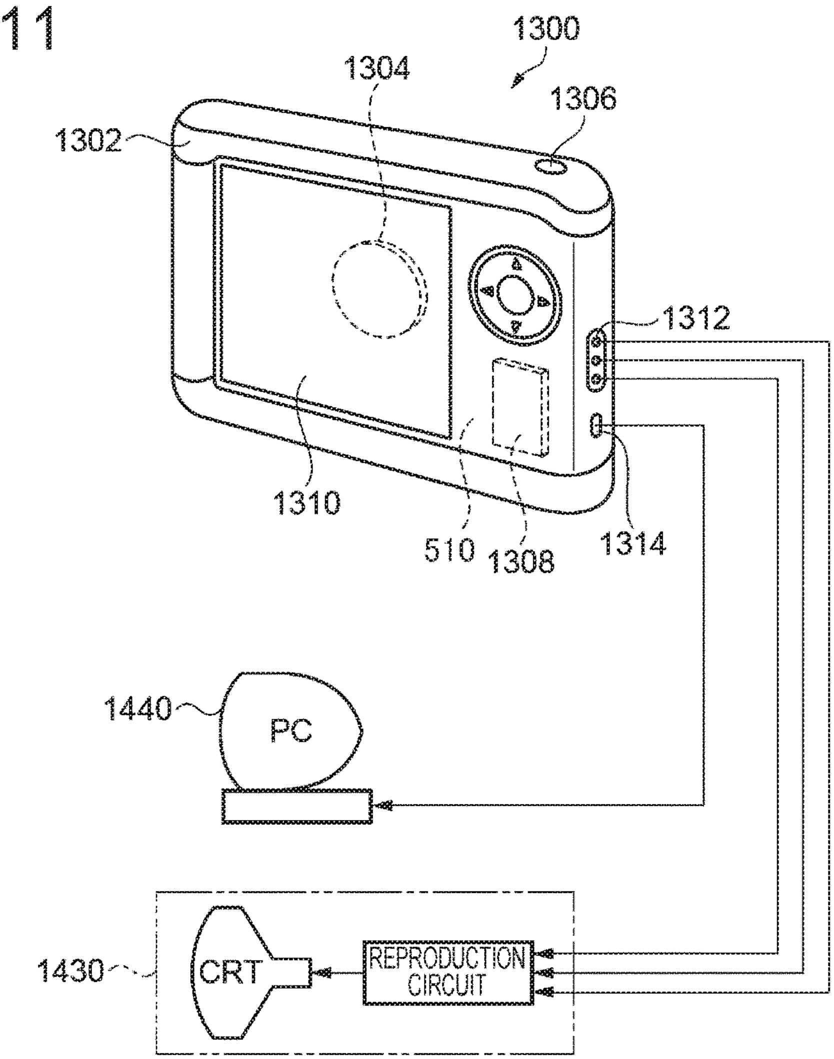
FIG. 11 is a perspective view schematically showing a digital camera as an example of the electronic apparatus.

FIG. 11 is a perspective view schematically showing a digital camera 1300 as an example of the electronic apparatus 500 according to the present embodiment. It should be noted that FIG. 11 also shows the connection with external equipment schematically. Here, typical cameras expose silver salt films to an optical image of an object on the one hand, the digital camera 1300 performs photoelectric conversion on the optical image of the object by an image capture element such as a CCD (a charge coupled device) to generate an imaging signal (an image signal), on the other hand.

A case (a body) 1302 of the digital camera 1300 is provided with the display section 1310 disposed on the back surface thereof to have a configuration of performing display in accordance with the imaging signal from the CCD, wherein the display section 1310 functions as a viewfinder for displaying the object as an electronic image. Further, the front surface (the back side in the drawing) of the case 1302 is provided with a light receiving unit 1304 including an optical lens (an imaging optical system), the CCD, and so on. When the photographer checks an object image displayed on the display section 1310, and then holds down a shutter button 1306, the imaging signal from the CCD at that moment is transferred to and stored in a memory device 1308. Further, the digital camera 1300 is provided with video signal output terminals 1312 and an input/output terminal 1314 for data communication disposed on a side surface of the case 1302. Further, a television monitor 1430 and a personal computer 1440 are connected to the video signal output terminals 1312 and the input/output terminal 1314 for data communication, respectively, according to needs. Further, there is adopted the configuration in which the imaging signal stored in the memory device 1308 is output to the television monitor 1430 and the personal computer 1440 in accordance with a predetermined operation. The digital camera 1300 has the physical quantity sensor 510 as, for example, an angular velocity sensor, and performs a process such as image stabilization using the output signal of the physical quantity sensor 510.

3. Vehicle

Figure 12:
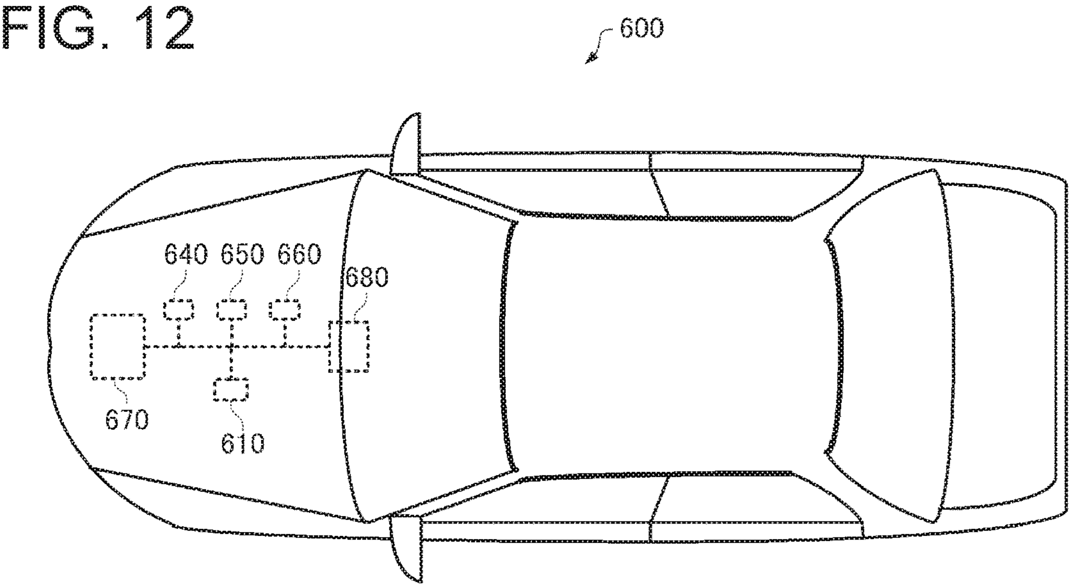
FIG. 12 is a diagram (a top view) showing an example of a vehicle.

FIG. 12 is a diagram (a top view) showing an example of a vehicle according to the present embodiment. The vehicle 600 shown in FIG. 12 is configured including a physical quantity sensor 610, controllers 640, 650, 660, a battery 670, and a navigation system 680. It should be noted that the vehicle according to the present embodiment can be provided with a configuration obtained by omitting some of the constituents (sections) shown in FIG. 12, or adding other constituents thereto.

The physical quantity sensor 610, the controllers 640, 650, 660, and the navigation system 680 operate with the power supply voltage supplied by the battery 670.

The physical quantity sensor 610 detects the physical quantity, and outputs the detection result to the controllers 640, 650, 660.

The controllers 640, 650, 660 are control devices for performing a variety of types of control such as an attitude control system, an overturn prevention system, and a braking system using the output signal of the physical quantity sensor 610.

The navigation device 680 displays a variety of types of information such as the location of the vehicle 600 and the time based on the output information of an embedded GPS receiver (not shown). Further, the navigation system 680 identifies the location and the orientation of the vehicle 600 based on the output signal of the physical quantity sensor 610 even in the case in which the GPS radio wave fails to reach the navigation system 680, and continues the display of the necessary information.

By applying, for example, the physical quantity sensor 1 according to any one of the embodiments described above as the physical quantity sensor 610, it is possible to realize, for example, the vehicle high in reliability.

As such a vehicle 600, there can be adopted a variety of types of vehicles, and there can be cited a car (including an electric car), an aircraft such as a jet plane or a helicopter, a ship, a boat, a rocket, an artificial satellite, and so on.

4. Modified Examples

The invention is not limited to the present embodiment, but can be implemented with a variety of modifications within the scope or the spirit of the invention.

For example, in the embodiments described above, there are illustrated the acceleration and angular velocity as the physical quantities to be detected by the sensor element 2, but angular acceleration, pressure, geomagnetism, a tilt, and so on can also be adopted besides the above. Further, in the case in which the sensor element 2 is a vibration type sensor element, the shape of the vibrator element of the sensor element 2 can also be, for example, a tuning fork type, a comb-tooth type, a double-T type, a tuning bar type shaped like a triangular prism, a quadratic prism, or a circular cylinder. Further, the material of the vibrator element can be a piezoelectric material such as a piezoelectric single crystal such as quartz crystal ($SiO_2$), lithium tantalate ($LiTaO_3$), or lithium niobate ($LiNbO_3$), or a piezoelectric ceramics such as lead zirconate titanate (PZT), or a silicon semiconductor. Further, it is also possible for the vibrator element to be provided with a structure in which, for example, a piezoelectric thin film such as zinc oxide (ZnO) or aluminum nitride (AlN) sandwiched by drive electrodes is disposed in a part of the surface of the silicon semiconductor. Further, the sensor element 2 can be a vibration type sensor element such as a piezoelectric type, an electrodynamic type, a capacitance type, an eddy current type, an optical type, or a strain gauge type, or can also be a sensor element of, for example, an optical type, a rotary type, or a fluid type besides the vibration type.

Further, for example, the temperature detection element (the temperature sensor element) 50 can also be an element externally attached to the control device.

The embodiments and the modified examples described above are illustrative only, and the invention is not limited to the embodiments and the modified examples. For example, it is also possible to arbitrarily combine the embodiments and the modified examples described above with each other.

The invention includes configurations (e.g., configurations having the same function, the same way, and the same result, or configurations having the same object and the same advantages) substantially the same as those explained in the description of the embodiments. Further, the invention includes configurations obtained by replacing a non-essential part of the configuration explained in the above description of the embodiments. Further, the invention includes configurations providing the same functions and the same advantage, or configurations capable of achieving the same object, as the configuration explained in the description of the embodiments. Further, the invention includes configurations obtained by adding a known technology to the configuration explained in the description of the embodiments.

The entire disclosure of Japanese Patent Application No. 2017-089802, filed Apr. 28, 2017 is expressly incorporated by reference herein.

What is claimed is:

1. An inertial sensor element control device adapted to be connected to an inertial sensor element having temperature characteristics, the inertial sensor element control device comprising:

a memory adapted to store temperature compensation information with respect to the temperature characteristics, and update history information of the temperature compensation information;

an update determination circuit adapted to determine necessity of an update of the temperature compensation information based on a signal based on an output signal of a temperature sensor element and the update history information;

a rest determination circuit adapted to determine whether or not the inertial sensor element is at rest; and an updating circuit adapted to perform an updating process of the temperature compensation information based on a determination result of the update determination circuit, a determination result of the rest determination circuit, a signal based on an output signal of the inertial sensor element, and a signal based on an output signal of the temperature sensor element.

2. The inertial sensor element control device according to claim 1, wherein the update history information includes time information of the update of the temperature compensation information, and the update determination circuit determines the necessity of the update of the temperature compensation information based on the time information.

3. An inertial sensor comprising:

the inertial sensor element control device according to claim 2; and the inertial sensor element.

4. The inertial sensor element control device according to claim 1, wherein the update determination circuit predicts a temporal change of the signal based on the output signal of the temperature sensor element based on a first operation information signal input from an outside and the update history information, and determines the necessity of the update of the temperature compensation information based on a prediction result.

5. An inertial sensor comprising:

the inertial sensor element control device according to claim 4; and the inertial sensor element.

6. The inertial sensor element control device according to claim 1, wherein the rest determination circuit determines whether or not the inertial sensor element is at rest with a signal based on an output signal of the inertial sensor element.

7. An inertial sensor comprising:

the inertial sensor element control device according to claim 6; and the inertial sensor element.

8. The inertial sensor element control device according to claim 6, wherein the rest determination circuit obtains the signal based on an output signal of the inertial sensor element a plurality of times to determine whether or not the inertial sensor element is at rest based on a variation in the signal obtained the plurality of times.

9. An inertial sensor comprising:

the inertial sensor element control device according to claim 8; and the inertial sensor element.

10. The inertial sensor element control device according to claim 6, wherein the inertial sensor element control device is adapted to be connected to a plurality of the inertial sensor elements, and the rest determination circuit determines whether or not the plurality of inertial sensor elements is at rest with the signal based on some of the output signals of the plurality of inertial sensor elements.

11. An inertial sensor comprising:

the inertial sensor element control device according to claim 10; and the inertial sensor element.

12. The inertial sensor element control device according to claim 10, wherein the plurality of inertial sensor elements includes a first inertial sensor element, and a second inertial sensor element higher in power consumption than the first inertial sensor element, and the rest determination circuit determines whether or not the plurality of inertial sensor elements is at rest with the signal based on the output signal of the first inertial sensor element.

13. The inertial sensor element control device according to claim 1, wherein the rest determination circuit determines whether or not the inertial sensor element is at rest based on a second operation information signal input from an outside.

14. The inertial sensor element control device according to claim 1, further comprising:

a usage determination circuit having a first operation mode, and a second operation mode lower in power consumption than the first operation mode, and adapted to determine whether or not the inertial sensor element is in use, wherein the usage determination circuit sets one of the first operation mode and the second operation mode based on a third operation information signal input from an outside.

15. The inertial sensor element control device according to claim 1, wherein the updating process includes a process of storing a signal based on the output signal of the temperature sensor element, and a signal based on the output signal of the inertial sensor element in the memory as the temperature compensation information.

16. The inertial sensor element control device according to claim 1, wherein the inertial sensor element is a vibration type sensor element including a drive section and a detection section.

17. An inertial sensor comprising:

the inertial sensor element control device according to claim 1; and the inertial sensor element.

18. An electronic apparatus comprising:

the inertial sensor according to claim 17.

19. A vehicle comprising:

the inertial sensor according to claim 17.

20. A method of updating temperature compensation information of an inertial sensor element control device, the method comprising:

providing the inertial sensor element control device adapted to be connected to an inertial sensor element having temperature characteristics, and which includes a memory adapted to store temperature compensation information with respect to the temperature characteristics, and update history information of the temperature compensation information;

determining, in an update determination circuit, necessity of an update of the temperature compensation information based on a signal based on an output signal of a temperature sensor element and the update history information;

determining, in a rest determination circuit, whether or not the inertial sensor element is at rest; and performing, in an updating circuit, an updating process of the temperature compensation information based on a determination result of the necessity of the update of the temperature compensation information, a determination result on whether or not the inertial sensor element is at rest, a signal based on an output signal of the inertial sensor element, and a signal based on an output signal of the temperature sensor element.

* * * * *